United States Patent
Yokoe et al.

(10) Patent No.: US 9,564,784 B2
(45) Date of Patent: Feb. 7, 2017

(54) COVER STRUCTURE IN MOTOR

(71) Applicant: NIDEC SANKYO CORPORATION, Nagano (JP)

(72) Inventors: Satoru Yokoe, Nagano (JP); Tetsuhiko Hara, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 498 days.

(21) Appl. No.: 14/221,522

(22) Filed: Mar. 21, 2014

(65) Prior Publication Data

US 2014/0292128 A1 Oct. 2, 2014

(30) Foreign Application Priority Data

Mar. 28, 2013 (JP) .................... 2013-068622
Dec. 17, 2013 (JP) .................... 2013-260687

(51) Int. Cl.
*H02K 5/22* (2006.01)
*H02K 3/52* (2006.01)
*H02K 5/08* (2006.01)
*H02K 7/116* (2006.01)

(52) U.S. Cl.
CPC .............. *H02K 5/225* (2013.01); *H02K 3/525* (2013.01); *H02K 5/08* (2013.01); *H02K 7/116* (2013.01)

(58) Field of Classification Search
CPC ................................ H02K 5/225; H02K 3/525
See application file for complete search history.

(56) References Cited

U.S. PATENT DOCUMENTS

| 5,001,379 A * | 3/1991 | Katayama | H01F 5/04 310/194 |
| 5,138,208 A * | 8/1992 | Kondo | H02K 9/22 310/43 |
| 5,382,855 A * | 1/1995 | Cousin | H02K 11/25 310/43 |
| 7,385,327 B2 * | 6/2008 | Kondo | F02D 9/1065 310/71 |
| 2007/0210658 A1* | 9/2007 | Terauchi | H02K 5/04 310/68 B |

FOREIGN PATENT DOCUMENTS

JP 2007282479 A 10/2007

* cited by examiner

*Primary Examiner* — Dang Le
(74) *Attorney, Agent, or Firm* — Cantor Colburn LLP

(57) ABSTRACT

A cover structure in a motor may include a rotor, a stator having a drive coil, a connector provided so that an engaging connector is engaged in a rotation shaft direction of the rotor, a main body cover covering outer peripheries of the stator and the connector and integrally formed with a connector cover, coil terminals extended from the stator to an outer side, connector terminals supported by a terminal support part integrally formed with the connector cover and are extended at a position offset from the coil terminals in the rotation shaft direction, and a wall part which is provided on a radially inner side of the terminal support part along the connector terminals. The wall part is located on an outer side in the radial direction with respect to the coil terminals, and a space is formed on a radially inner side of the wall part.

15 Claims, 12 Drawing Sheets

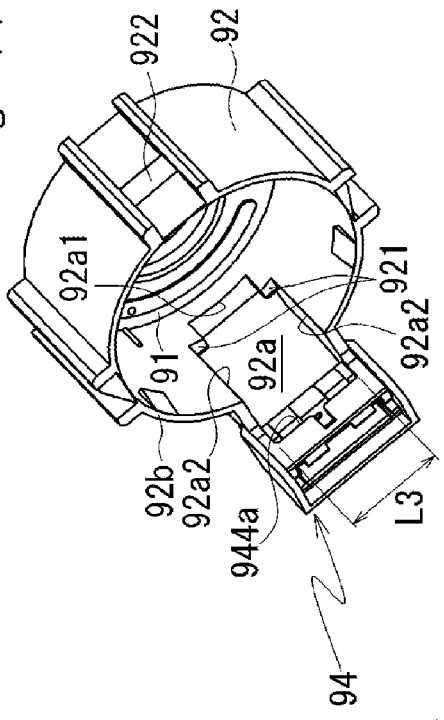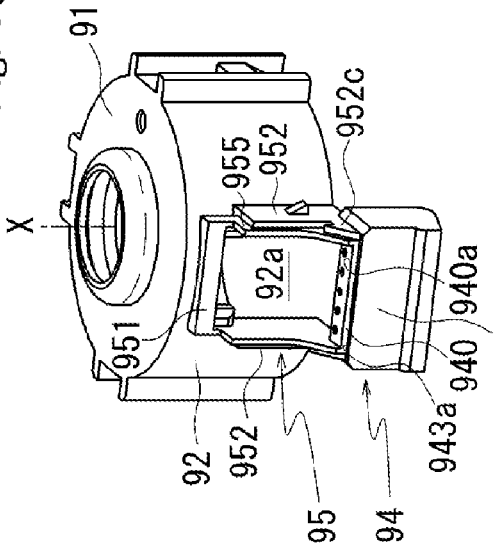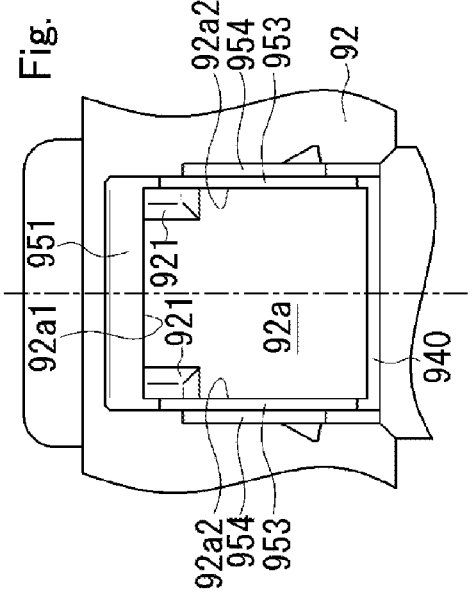

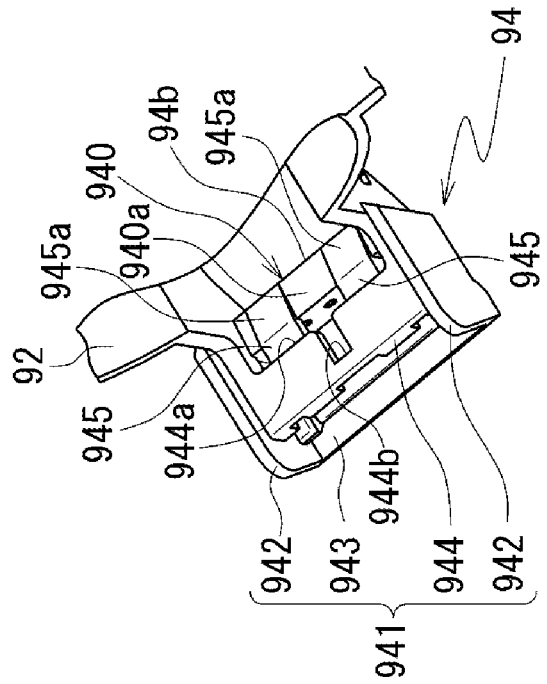
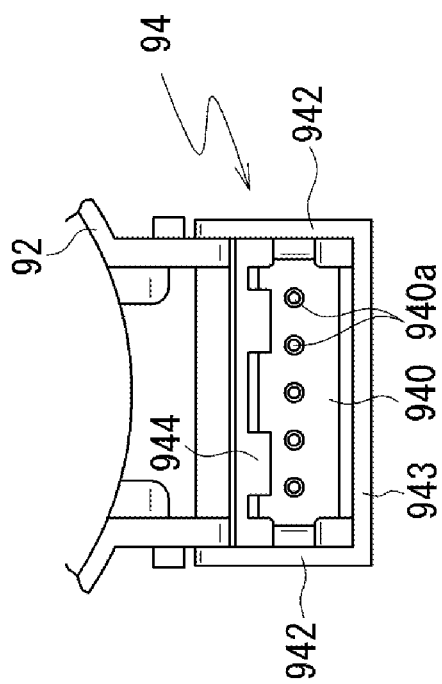

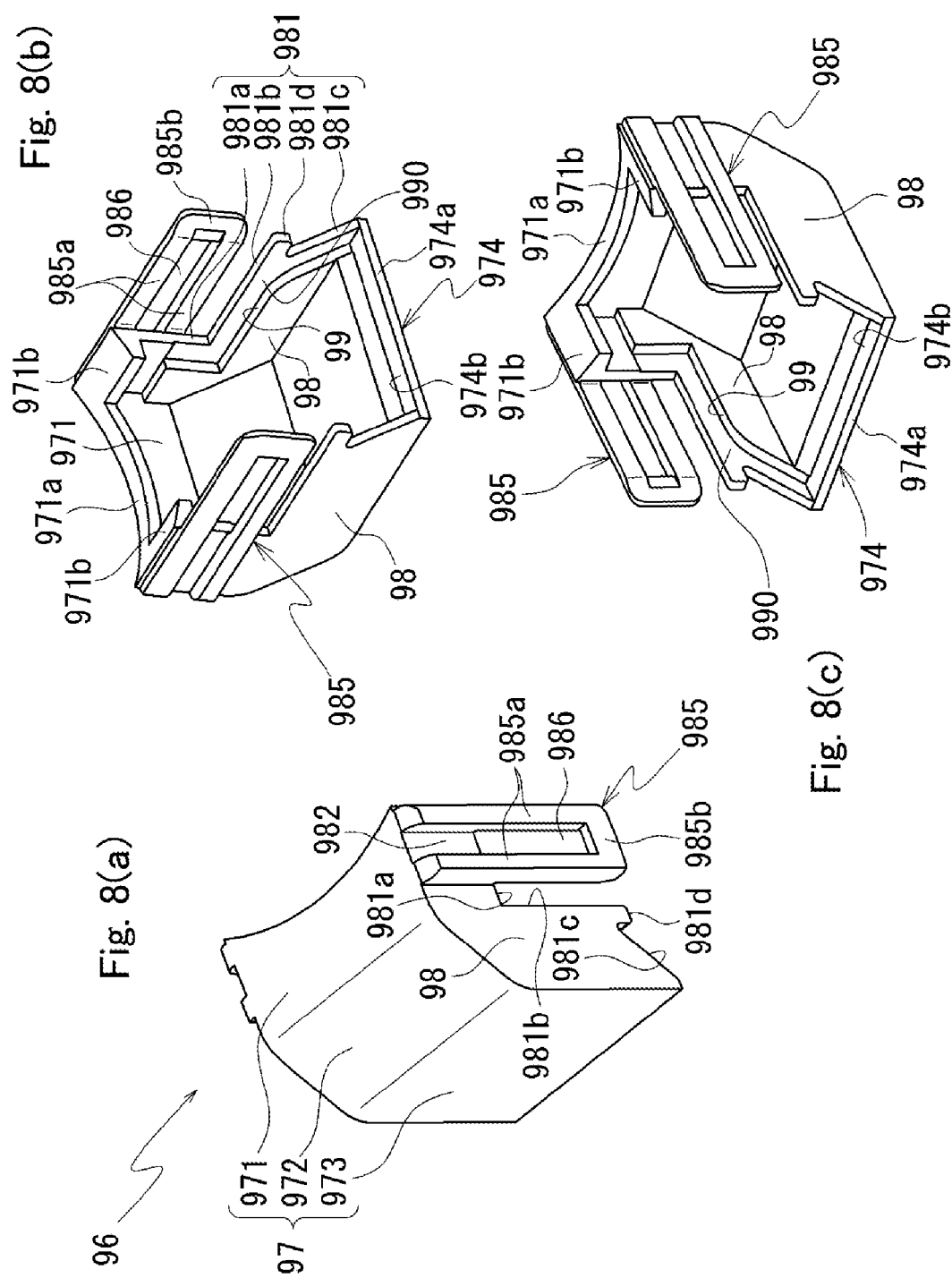

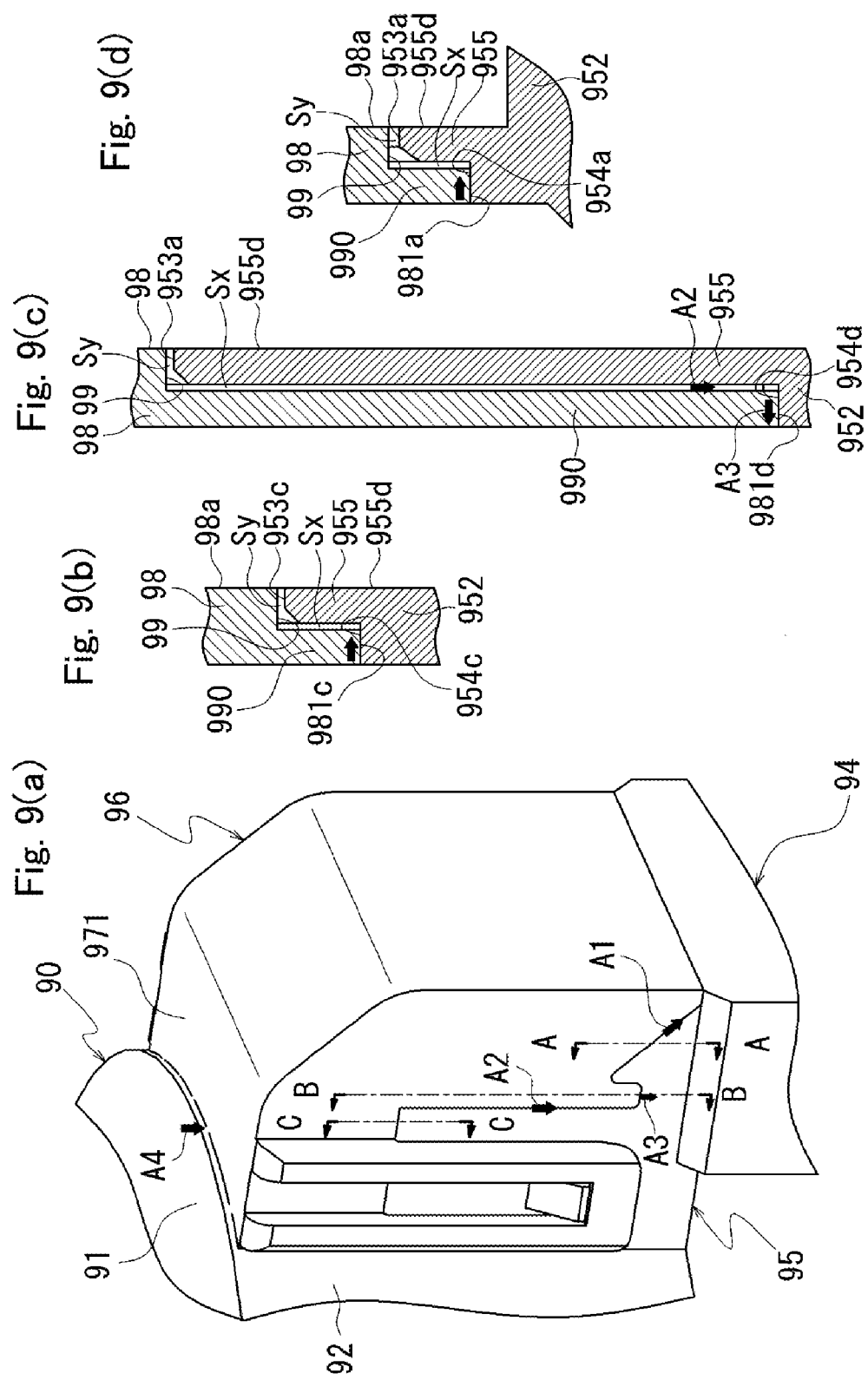

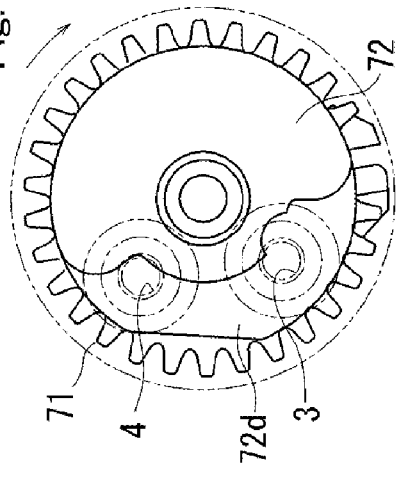
Fig. 12(a) Valve Closed State
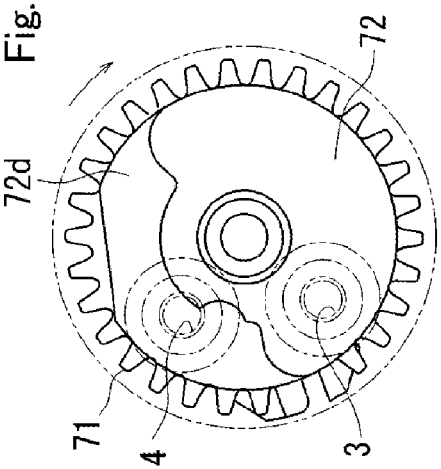
Fig. 12(b) First Valve Open State
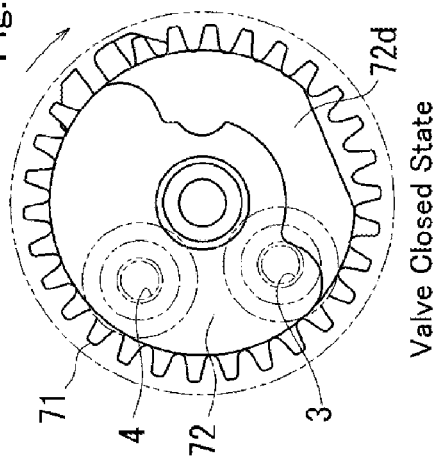
Fig. 12(c) Second Valve Open State
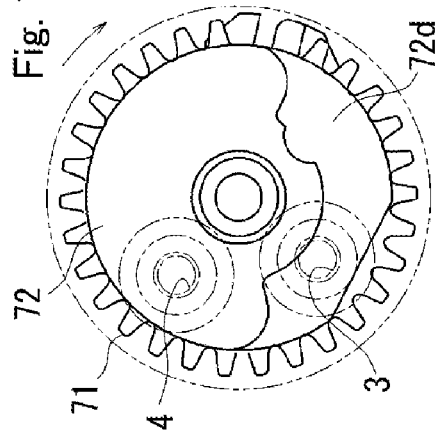
Fig. 12(d) Third Valve Open State

COVER STRUCTURE IN MOTOR

CROSS REFERENCE TO RELATED APPLICATION

The present invention claims priority under 35 U.S.C. §119 to Japanese Application No. 2013-068622 filed Mar. 28, 2013 and Japanese Application No. 2013-260687 filed Dec. 17, 2013, the entire contents of which are incorporated herein by reference.

FIELD OF THE INVENTION

At least an embodiment of the present invention may relate to a cover structure in a motor.

BACKGROUND

A stator structure of a motor has been disclosed in Japanese Patent Laid-Open No. 2007-282479.

In this stator structure, a connector is provided on an outer side in a radial direction of a stator part and the connector is arranged in a direction so that an engaging connector is engaged with and disengaged from in an axial direction. The stator part includes drive coils and coil terminals with which end parts of the drive coils are connected, and the connector is provided with connector terminals disposed along the axial direction. The connector terminals and the coil terminals are connected with each other on an outer side of the stator part in the radial direction.

A main body case for covering an outer periphery of the stator part and its upper face is integrally provided with a connector cover for covering an outer periphery of the connector and, when the stator part is accommodated in the main body case, the connector is also accommodated in the connector cover.

Stress is acted on the connector when the connector and an engaging connector are to be engaged with and disengaged from each other. In the stator structure described in the above-mentioned Patent Literature, the connector and the connector cover are separately provided from each other. Therefore, in order to prevent the connector applied with the stress from being detached from the connector cover, a support structure (support member) for the connector is provided on an inner side of the connector cover to secure support strength for the connector in the connector cover.

In order to further enhance the support strength for the connector, it is conceivable that the support member for the connector described in the Patent Literature is integrally formed with the connector cover which is integrally formed with the main body case. However, in the case described in the Patent Literature, the coil terminals and the support member for the connector are provided in an overlapped relationship in position when viewed in an axial direction of the stator part and thus, in a case that the support member for the connector is integrally formed with the connector cover which is integrally formed with the main body case, when the stator part is to be assembled to the main body case, the coil terminals are interfered with the support member and the assembling is not performed.

In view of the problem described above, at least an embodiment of the present invention may advantageously provide a cover structure in a motor in which assembling work of the motor including a main body cover integrated with a connector cover is performed easily.

SUMMARY

According to at least an embodiment of the present invention, there may be provided a cover structure in a motor including a rotor, a stator having a drive coil which is located on an outer side in a radial direction of the rotor, a connector which is provided on an outer side in the radial direction with respect to the rotor so that an engaging connector is engaged in a rotation shaft direction of the rotor, a main body cover having a peripheral wall which covers an outer periphery of the stator, the main body cover covering an outer periphery of the connector and being integrally formed with a connector cover extending in the rotation shaft direction from an outer side in the radial direction of the peripheral wall, an opening part which is provided in the peripheral wall so that an inner side of the main body cover is in communication with an inner side of the connector cover, coil terminals which are connected with an end part of the drive coil and are extended from the stator to an outer side in the radial direction through the opening part, connector terminals which are supported by a terminal support part integrally formed with the connector cover and are extended in the rotation shaft direction at a position offset from the coil terminals in the rotation shaft direction, the connector terminals and the coil terminals being connected with each other in an inside of the connector cover, and a wall part which is provided on a radially inner side of the terminal support part so as to extend in the rotation shaft direction along the connector terminals. The wall part is located on an outer side in the radial direction with respect to the coil terminals when viewed in the rotation shaft direction, and a space is formed on a radially inner side of the wall part in an inner side of the connector cover for passing the coil terminals when the main body cover and the stator to be assembled.

According to this structure, a space is provided on a radially inner side of the wall part and thus the coil terminals and the wall part are not overlapped with each other when viewed in the axial direction of the stator. Therefore, when the stator is to be assembled to the main body cover, the coil terminals extending to an outer side in the radial direction from the stator do not interfere with the wall part. Accordingly, assembling of the stator to the main body cover can be performed surely.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 5(a), 5(b) and 5(c) are views for explaining an upper cover member.

FIGS. 7(a) and 7(b) are views for explaining a connector part.

FIGS. 8(a), 8(b) and 8(c) are views for explaining a cap of a connector cover part.

FIGS. 9(a) through 9(d) are a perspective view showing a connector cover part and cross-sectional views showing a part of the connector cover part.

FIGS. 12(a) through 12(d) are views for explaining an operation of a valve drive device.

DETAILED DESCRIPTION OF THE PREFERRED EMBODIMENTS

An embodiment of the present invention in which, as an example, the present invention is applied to a valve drive device (gear unit) of a valve device for opening and closing a flow passage for refrigerant in a refrigerator, will be described in detail below with reference to the accompanying drawings. In respective drawings, the same reference signs are used in common portions and redundant descriptions are omitted. Further, in the following descriptions, a positional relationship of respective structural elements of the valve drive device will be explained appropriately with an upper side and a lower side in the valve drive device 1 shown in FIG. 1 as a reference.

Figure 1:
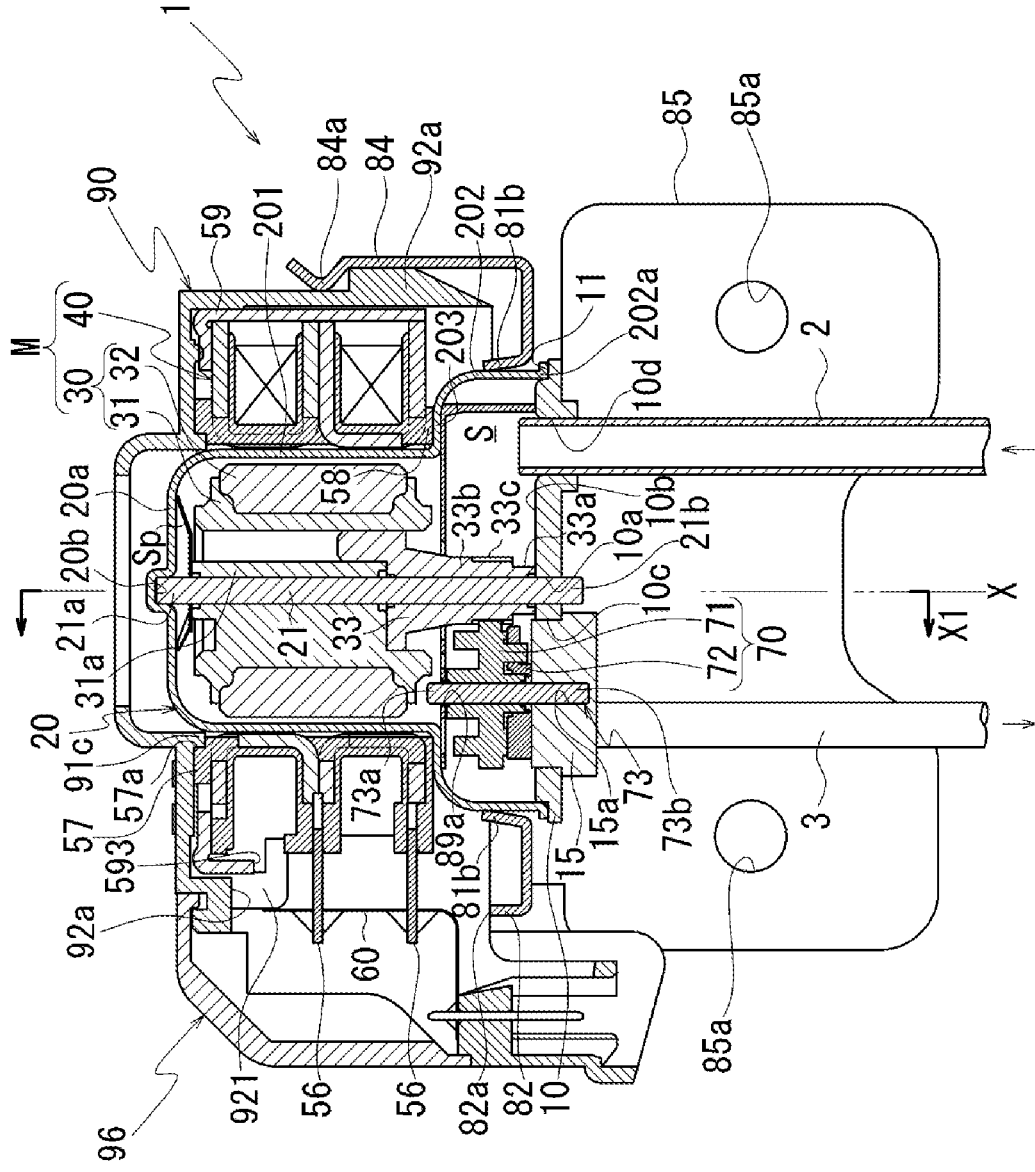
FIG. 1 is a cross-sectional view showing a valve drive device in accordance with an embodiment of the present invention.
Figure 2:
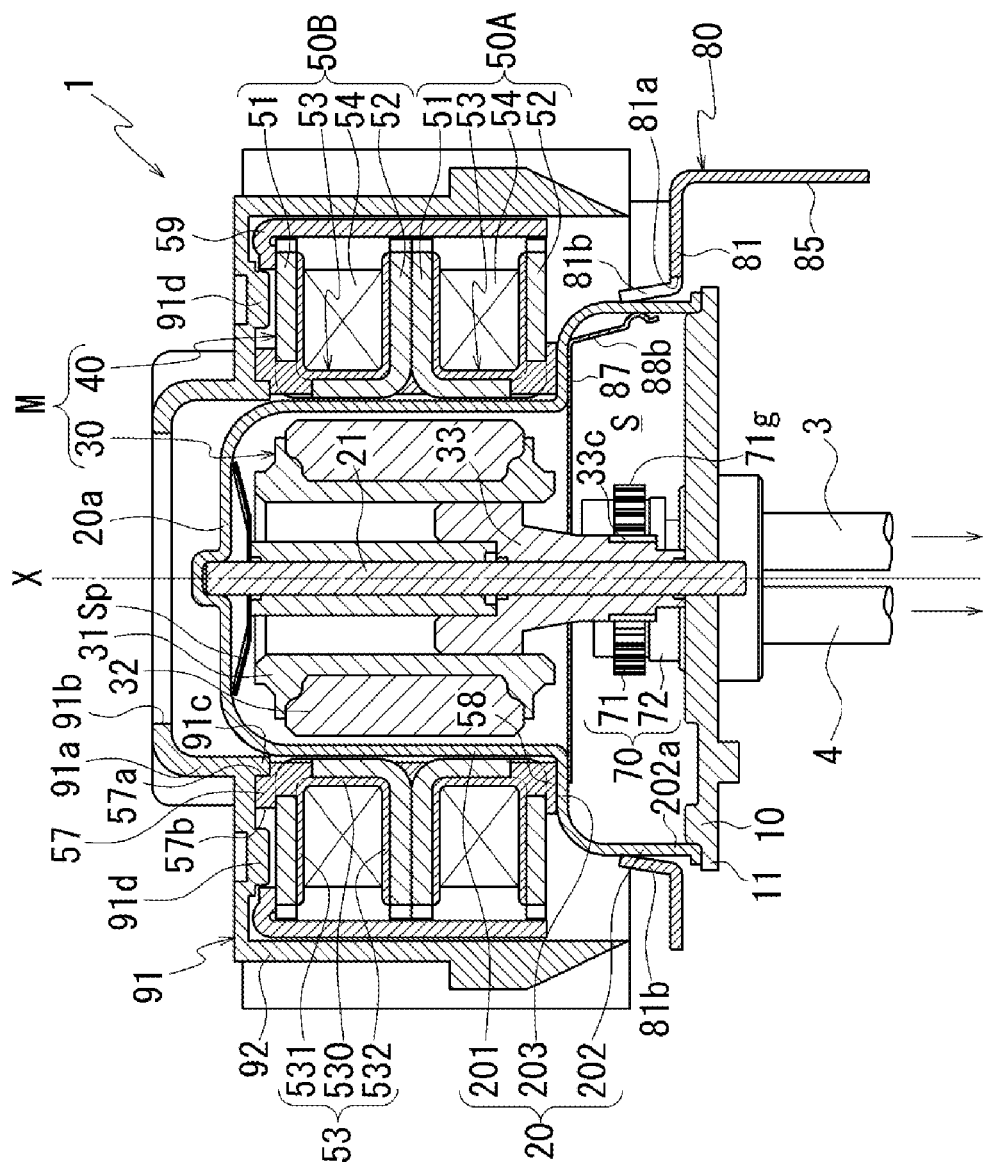
FIG. 2 is the "X1"-"X1" cross-sectional view in FIG. 1.
Figure 3:
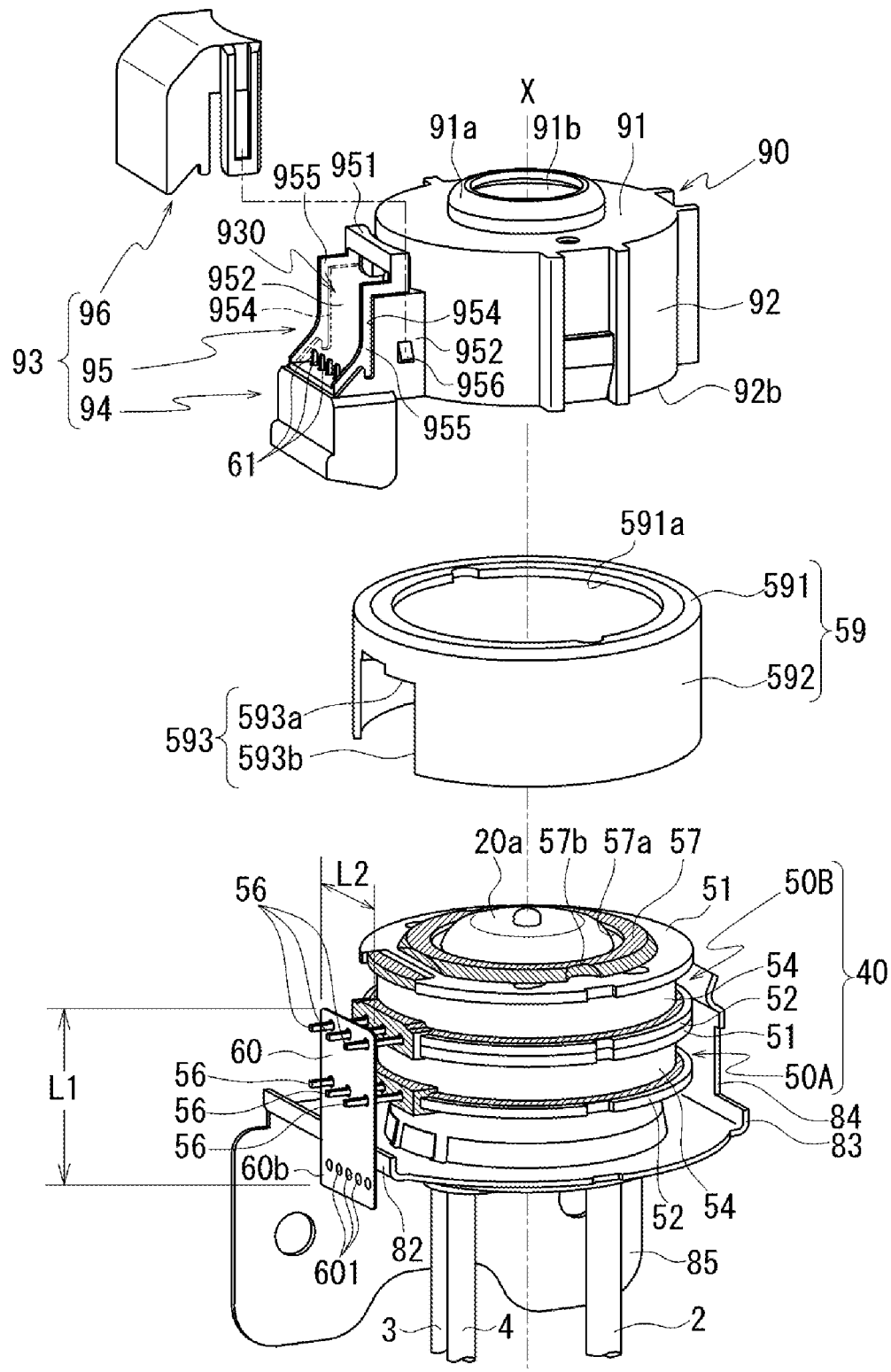
FIG. 3 is an exploded perspective view showing a part of a valve drive device.

FIG. 1 is a cross-sectional view showing a valve drive device 1 in accordance with an embodiment of the present invention. FIG. 2 is the "X1"-"X1" cross-sectional view in FIG. 1. FIG. 3 is an exploded perspective view showing a motor "M" side of the valve drive device 1. In FIG. 3, a portion formed of resin in a stator assembly 40 is shown with hatching.

As shown in FIGS. 1 through 3, the valve drive device 1 in accordance with an embodiment of the present invention is a valve device which structures a flow passage through which fluid (in this embodiment, refrigerant) is circulated between a refrigerator (not shown) that is an external apparatus and the valve device, and in which the fluid introduced into a fluid chamber "S" through a fluid lead-in pipe 2 from the refrigerator is led out to the refrigerator through fluid lead-out pipes 3 and 4. In the valve drive device 1, a valve part 70 is driven by a motor "M" so that the fluid introduced into the fluid chamber "S" is led out to the refrigerator side through the fluid lead-out pipes 3 and 4. A claw-pole type stepping motor in which a pair of stator assemblies 50A and 50B ("A"-phase coil and "B"-phase coil) are adjacently disposed in an axial direction of a rotor 30 is used as the motor "M" in the valve drive device 1. Further, the valve drive device 1 is used in an arrangement (see FIG. 1) in which the rotor 30 of the motor "M" is disposed on an upper side and the fluid chamber "S" is disposed on a lower side.

In the valve drive device 1, the fluid chamber "S" is formed by a partition 20, which is formed in a bottomed cylindrical shape and is fixed to an upper face of a bottom plate part 10, between the bottom plate part 10 and the partition 20. In the valve drive device 1, the partition 20 is provided so that its bottom part 20a is positioned on an upper side which is an opposite side to the bottom plate part 10. The partition 20 is provided with an outward form which is enlarged in two steps in a separated direction from the bottom part 20a and is structured of a small diameter part 201 on a bottom part 20a side and a large diameter part 202 on a bottom plate part 10 side. A step part 11 to which a tip end 202a of the large diameter part 202 is fitted from an outer side is provided at an outer circumferential edge of the bottom plate part 10 over the entire periphery. The partition 20 is fixed to the bottom plate part 10 in a state that the tip end 202a of the large diameter part 202 is fitted to the step part 11.

A rotor 30 of the motor "M" is disposed on an inner side of the small diameter part 201 in a state that the rotor 30 is fitted to a shaft member 21 on an outer side. The shaft member 21 is provided along the axial line "X" in the valve drive device 1. One end 21a of the shaft member 21 is supported by a recessed part 20b of the bottom part 20a and the other end 21b is brazed to a hole part 10a of the bottom plate part 10 and thus the shaft member 21 is provided in a rotation prevented state. The rotor 30 is rotatably supported by the shaft member 21 and is rotated around the axial line "X" when the motor "M" is driven.

The rotor 30 is structured of a base part 31 having a bearing part 31a into which the shaft member 21 is inserted and a magnet 32 in which an "N"-pole and an "S"-pole are alternately disposed to each other in a circumferential direction around the axial line "X". The magnet 32 is integrally formed with the rotor 30 by insert molding when the rotor 30 is resin-molded and the magnet 32 is provided over the entire periphery of the base part 31 in a circumferential direction around the axial line "X".

A transmission shaft 33 for transmitting rotation of the rotor 30 to the valve part 70 described below is inserted and fixed between the bearing part 31a and the base part 31 in a lower part on the bottom plate part 10 side of the base part 31. The transmission shaft 33 is, similarly to the rotor 30, rotatably supported by the shaft member 21 and is rotated together with the rotor 30 around the axial line "X".

The transmission shaft 33 is extended downward on the bottom plate part 10 side along the axial line "X" and its tip end part 33a is abutted with an upper face 10b of the bottom plate part 10. In this embodiment, the rotor 30 is urged downward on the bottom plate part 10 side by a spring "Sp" which is fitted to one end 21a side of the shaft member 21 from an outer side and the tip end part 33a of the transmission shaft 33 is always abutted with the upper face 10b of the bottom plate part 10 by an urging force of the spring "Sp" to position the rotor 30 in an axial direction of the axial line "X".

A large diameter part 33b whose diameter is larger than the tip end part 33a is formed on an upper side of the tip end part 33a of the transmission shaft 33, and an outer periphery of the large diameter part 33b is formed with a teeth part 33c which is engaged with a teeth part 71g provided on an outer periphery of a gear 71 described below (see FIG. 2).

As shown in FIG. 1, a small diameter part 201 of the partition 20 which accommodates the rotor 30 is formed in a cylindrical shape so as to surround the magnet 32 of the rotor 30 through a predetermined distance and a stator assembly 40 is attached to an outer periphery of the small diameter part 201. In this embodiment, a circular plate part 203 which connects the small diameter part 201 with the large diameter part 202 is formed so as to be perpendicular to the axial line "X". The stator assembly 40 fitted to the small diameter part 201 from an outer side is positioned by the circular plate part 203, and two stator assemblies 50A and 50B are disposed on an outer side in the radial direction of the rotor 30 (magnet 32). Since the magnet 32 of the rotor 30 is driven by a magnetic force from the stator assembly 40 described below through the partition 20, the partition 20 is structured of nonmagnetic material. Further, the partition 20 is structured of metal so as to be capable of withstanding a pressure in the fluid chamber "S". Therefore, the partition 20 is structured of stainless steel which is non-magnetic metal.

As shown in FIG. 2, the stator assembly 40 includes two stator assemblies 50A and 50B which are disposed so as to be superposed on each other in the axial direction of the axial line "X", and an outer stator core 59 surrounding outer peripheries of the stator assemblies 50A and 50B is attached to the stator assembly 40 from an outer side. The outer stator core 59 is, similarly to inner stator cores 51 and 52 described below, formed by press working of a plate body of magnetic material and, when attached to the stator assemblies 50A and 50B from an outer side, the outer stator core 59 is provided in a state that the outer stator core 59 and the inner stator cores 51 and 52 are contacted with each other to structure magnetic paths by the outer stator core 59 and the inner stator cores 51 and 52.

Each of the stator assemblies 50A and 50B is provided with a basic structure that a coil 54 which is wound around an outer periphery of a bobbin 53 is disposed between a pair of inner stator cores 51 and 52 disposed with a certain space therebetween in the axial direction. The bobbin 53 of the stator assembly 40 is a resin molded body (insulator) into which the inner stator cores 51 and 52 of the stator assemblies 50A and 50B are buried by insert molding and is integrally formed with a terminal holding part 55 described below.

Figure 4A:
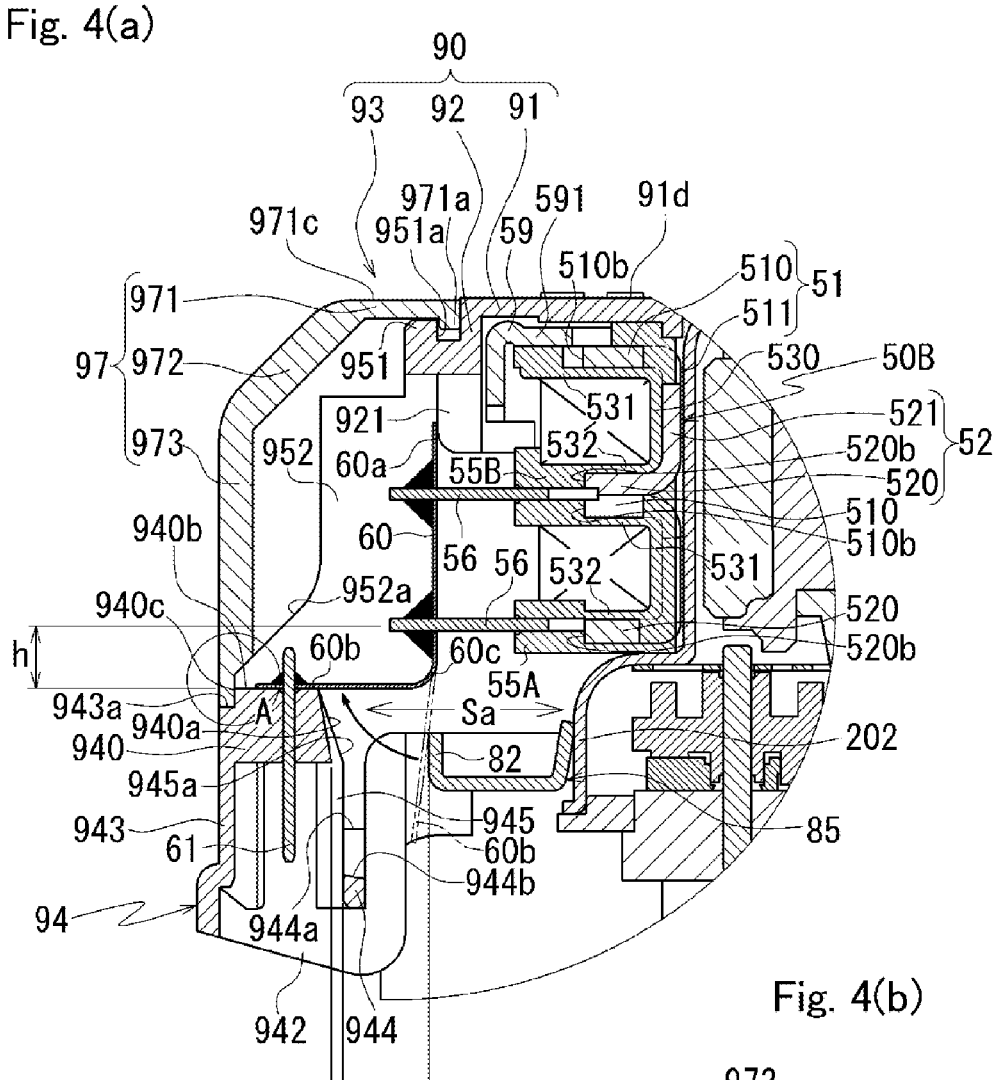
FIGS. 4(a) and 4(b) are views for explaining a connector cover part of an upper cover member.
Figure 4B:
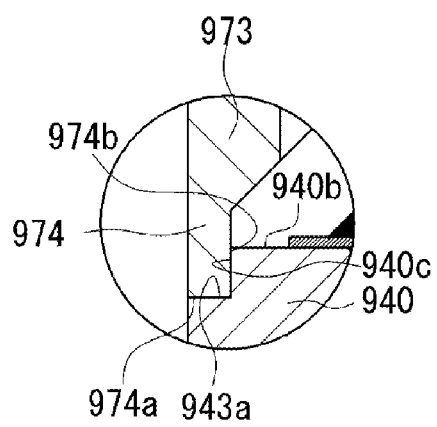

FIG. 4(a) is an enlarged cross-sectional view showing a part of the valve drive device 1 in FIG. 1 and FIG. 4(b) is an enlarged view showing the region "A" in FIG. 4(a). As shown in FIG. 4(a), the inner stator cores 51 and 52 are provided with ring-shaped flange parts 510 and 520, which are disposed in a direction perpendicular to the axial line "X", and a plurality of pole teeth 511 and 521 which are formed from inner peripheries of the flange parts 510 and 520 so as to stand in the axial line "X" direction. The pole teeth 511 and 521 are provided on a radially inner side of the flange parts 510 and 520 at an equal interval in a circumferential direction around the axial line "X". A pair of the inner stator cores 51 and 52 of each of the stator assemblies 50A and 50B is arranged so that the pole teeth 511 of the inner stator core 51 and the pole teeth 521 of the inner stator core 52 are arranged so as to be alternately adjacent to each other in the circumferential direction around the axial line "X" and the respective pole teeth 511 and 521 are disposed in a posture so as to face each other.

A cylindrical shaped base part 530 of the bobbin 53 around which a coil is wound on its outer periphery is disposed on an outer side in the radial direction of the pole teeth 511 and 521. Flange parts 531 and 532 extended to an outer side in the radial direction are provided at both ends of the base part 530 in the axial direction of the axial line "X" over the entire periphery in the circumferential direction around the axial line "X".

As shown in FIG. 2, in the stator assembly 40, the inner stator core 51 of the stator assembly 50A and the inner stator core 52 of the stator assembly 50B are provided in a state that the flange parts 510 and 520 (see FIG. 4(a)) are contacted with each other in the axial direction of the axial line "X". The inner stator core 51 and the inner stator core 52 are held in resin in a state that the flange parts 510 and 520 are contacted with each other without a gap space.

In the stator assembly 40 in which the inner stator cores 51 and 52 are buried, the pole teeth 511 and 521 are exposed to a radially inner side of the base part 530 of the bobbin 53, and faces on the coil 54 side of the flange parts 510 and 520 are covered with resin which structures the flange parts 531 and 532. In this embodiment, the pole teeth 511 and 521 are exposed on a radially inner side of the base part 530 of the bobbin 53. This is because that the radially inner sides of the pole teeth 511 and 521 are used as a positioning part for a die when the bobbin 53 into which the inner stator cores 51 and 52 are buried is to be formed by insert molding.

In the stator assembly 40, a ring-shaped attaching part 57 (see FIGS. 2 and 3) is formed by using resin material which covers an upper face on a radially inner side of the flange part 510 of the stator assembly 50B. A fitting wall 91c of an upper cover member 90 described below is attached to an inner side of the attaching part 57. Further, a ring-shaped abutting part 58 (see FIG. 2) is formed by using resin material which covers a lower face on a radially inner side of the flange part 520 of the stator assembly 50A. The abutting part 58 is abutted with the circular plate part 203 at a boundary portion between the small diameter part 201 and the large diameter part 202 in the axial line "X" direction when the stator assembly 40 is fitted to the small diameter part 201 of the partition 20 from an outer side. As a result, positioning in the axial direction of the stator assembly 40 is performed by the abutting part 58 which is abutted with the circular plate part 203.

As shown in FIG. 4(a), the flange parts 510 and 520 of the respective stator cores are formed with cut-out parts 510b and 520b at the outer peripheral parts which are recessed to the axial line "X" side, and the cut-out parts 510b and 520b of the respective flange parts 510 and 520 are provided at an overlapped position when viewed in the axial direction of the axial line "X". In this embodiment, a terminal holding part 55 is provided by utilizing the cut-out parts 510b and 520b.

The terminal holding part 55B of the stator assembly 50B is provided so as to extend over both of the cut-out parts 510b and 520b of the flange parts 510 and 520. The terminal holding part 55B is integrally formed with the flange parts 532 and 531 of the bobbin 53 which are located on both sides of the flange parts 510 and 520 and is provided with a predetermined thickness in the axial direction of the axial line "X".

The terminal holding part 55A of the stator assembly 50A is provided in the cut-out part 520b of the flange part 520 of the inner stator core 52. The terminal holding part 55A is integrally formed with the flange part 532 of the bobbin 53 of the stator assembly 50A and is provided with a predetermined thickness in the axial direction of the axial line "X".

The terminal holding part 55A of the stator assembly 50A and the terminal holding part 55B of the stator assembly 50B are provided so as to have a space therebetween in the axial line "X" direction. A plurality of coil terminals 56 is press-fitted and supported by the terminal holding parts 55A and 55B of the stator assemblies 50A and 50B. A plurality of the coil terminals 56 are protruded to an outer side in the radial direction from the stator assembly 40 and the base ends of the coil terminals 56 are located in the inside of the cut-out parts 510b and 520b.

Therefore, in the outer stator core 59 which is attached to the stator assembly 40 from an outer side, a surrounding wall part 592 surrounding outer peripheries of the stator assemblies 50A and 50B is formed with a cut-out part 593 (see FIG. 3) for avoiding interference with the coil terminals 56. Further, a surrounding wall part 92 of an upper cover member 90 described below is formed with an opening part 92a for avoiding interference with the coil terminals 56 (see FIG. 1). In this embodiment, the coil terminals 56 of the stator assembly 50A and the coil terminals 56 of the stator assembly 50B are closely disposed in the axial direction of the axial line "X" and thus a size of the range where the cut-out part 593 is formed in the outer stator core 59 and a size of the range where the opening part 92a is formed in the surrounding wall part 592 can be reduced.

As shown in FIG. 3, the outer stator core 59 is provided with a bottomed cylindrical shape and an opening 591a is provided at a center part of a bottom part 591 so as to be capable of inserting the bottom part 20a side of the partition 20. The surrounding wall part 592 provided over the entire periphery of the bottom part 591 is formed in a cylindrical shape which surrounds the flange parts 510 and 520 of the stator assemblies 50A and 50B over the entire peripheries.

As shown in FIG. 4(a), the coil terminal 56 is a bar-shaped pin having electro-conductivity which is extended in a straight line shape and is penetrated through the opening part 92a provided in the upper cover member 90 so that its tip end side is located in an inside of a connector cover part 93 (accommodation part 95).

In the stator assembly 40 in this embodiment, the terminal holding parts 55A and 55B are provided in the cut-out parts 510b and 520b of the flange parts 510 and 520 of the inner stator cores 51 and 52. Therefore, in comparison with a case that the cut-out part is not provided, the terminal holding parts 55A and 55B are preferably prevented from being protruded to the outer side in the radial direction and thus the size in the radial direction of the motor "M" is prevented from being increased.

Further, the terminal holding part 55A in the stator assembly 50A is provided by utilizing a thickness of the flange part 520 and the terminal holding part 55B in the stator assembly 50B is provided by utilizing thicknesses of the flange parts 510 and 520. Therefore, the thicknesses of the terminal holding parts 55A and 55B can be increased. As a result, support strengths for the coil terminals 56 in the terminal holding parts 55A and 55B are increased.

In the terminal holding part 55A of the stator assembly 50A, a plurality of the coil terminals 56 press-fitted and supported by the terminal holding part 55A is located in a range of the thickness of the flange part 520 of the inner stator core 52 of the stator assembly 50A. In the terminal holding part 55B of the stator assembly 50B, a plurality of the coil terminals 56 press-fitted and supported by the terminal holding part 55B is located in a range of the thickness of a superposed portion of the flange parts 510 and 520 of the stator cores which are superposed on each other in the axial direction.

In this embodiment, an end part (not shown) of a winding coil extended from the coil 54 ("A"-phase coil) of the stator assembly 50A is connected with a terminal holding part 55A side of the coil terminal 56 which is held by the terminal holding part 55A. Further, an end part (not shown) of a winding coil extended from the coil 54 ("B"-phase coil) of the stator assembly 50B is connected with a terminal holding part 55B side of the coil terminal 56 which is held by the terminal holding part 55B. The respective coil terminals 56 supported by the terminal holding parts 55A and 55B are connected with corresponding connector terminals 61 through a common printed circuit board 60 (hereinafter, referred to as a circuit board 60) having flexibility. The printed circuit board 60 is originally formed in a straight line shape and is connected with the connector terminals 61 by bending toward an outer side in the radial direction in a state that the printed circuit board 60 is connected with the coil terminals 56. Each of the coil terminals 56 is connected with a corresponding wiring line provided on the circuit board 60 by soldering on an opposite face to the coil 54 of the circuit board 60. Each of the coil terminals 56 is connected with the circuit board 60 on an outer side in the radial direction with respect to a connected portion of the end part (not shown) of a winding coil which is extended from the coil 54, and a space is secured between the terminal holding parts 55A and 55B and the circuit board 60 for connecting the end part (not shown) of the winding coil which is extended from the coil 54.

As shown in FIGS. 1 through 3, the upper cover member 90 is a member for accommodating the stator assembly 40 and the outer stator core 59 of the motor "M". The upper cover member 90 is provided with a cover part 91 covering an upper face of the stator assembly 40 and a surrounding wall part 92 which surrounds the outer periphery of the outer stator core 59, and the surrounding wall part 92 is integrally formed with a connector cover part 93.

A ring-shaped protruded part 91a viewed in the axial direction is provided at the center of the cover part 91. The center of the protruded part 91a is provided with an opening 91b through which the partition 20 located on an inner side of the protruded part 91a can be visually observed. A ring-shaped fitting wall 91c (see FIG. 2) is formed on an opposite side to the protruded part 91a of the cover part 91 so as to protrude downward, and the fitting wall 91c is fitted to a step part 57a (see FIG. 2) of a substantially ring-shaped attaching part 57 provided on an upper part of the stator assembly 40 from an inner side.

Figure 6B:
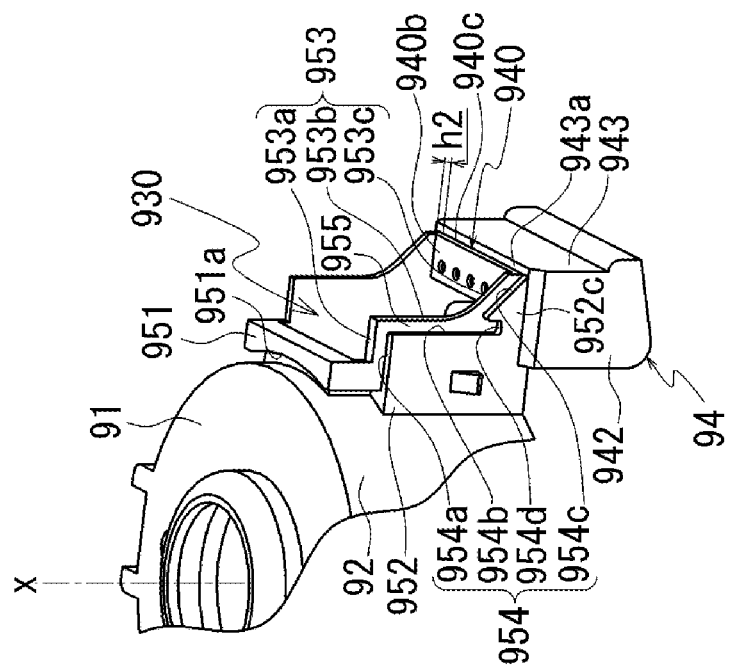
FIGS. 6(a) and 6(b) are views for explaining a connector cover part of an upper cover member.
Figure 6A:
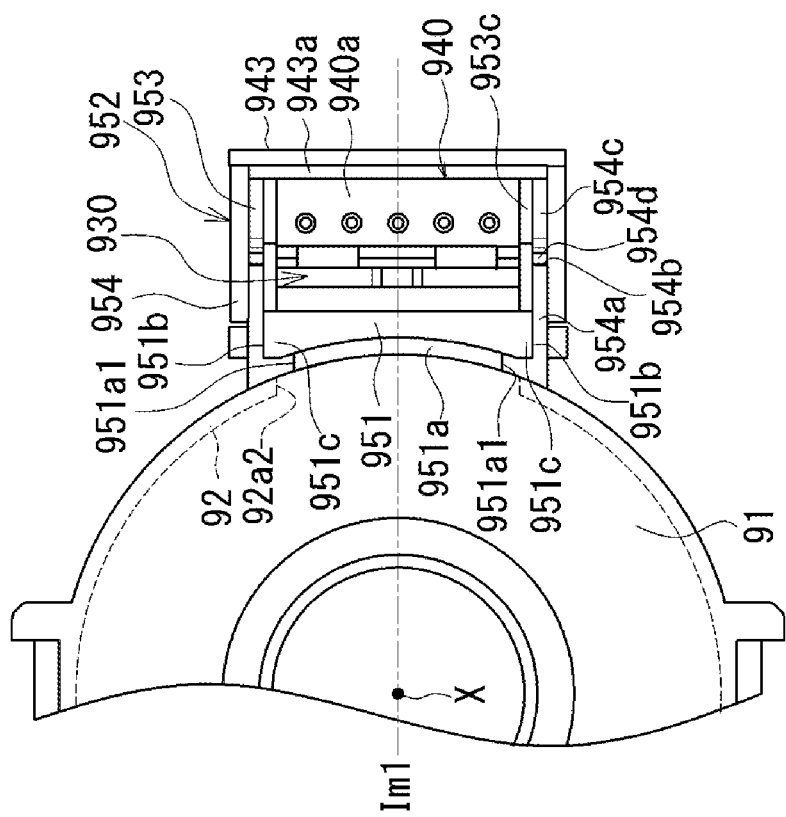

FIGS. 5(a), 5(b) and 5(c) are views for explaining the connector cover part 93 of the upper cover member 90. FIG. 5(a) is a perspective view showing a connector part 94 and an accommodation part 95 of the connector cover part 93 which is viewed from an obliquely upper right side, FIG. 5(b) is a perspective view showing the connector part 94 and the accommodation part 95 viewed from an obliquely lower side, and FIG. 5(c) is a plan view showing the accommodation part 95 viewed in the radial direction. FIGS. 6(a) and 6(b) are views for explaining the connector cover part 93. FIG. 6(a) is a plan view which is viewed from an upper side in the axial line "X" direction and FIG. 6(b) is its perspective view. FIGS. 7(a) and 7(b) are views for explaining the connector part 94. FIG. 7(a) is a plan view which is viewed from a lower side in the axial line "X" direction and FIG. 7(b) is a perspective view which is viewed from an obliquely lower side in the axial line "X" direction.

As shown in FIGS. 5(a), 5(b) and 5(c), the surrounding wall part 92 of the upper cover member 90 is formed in a ring shape viewed in the axial direction and the surrounding wall part 92 in the valve drive device 1 is provided so as to surround the outer periphery of the outer stator core 59. A lower end 92b of the surrounding wall part 92 (see FIG. 3) is located on a lower side in the axial line "X" direction with respect to the coil terminals 56 and the drive coils 54 which are disposed on the inner sides of the upper cover member 90 and the connector cover part 93. Therefore, water splashed onto the surrounding wall part 92 is preferably prevented from affecting a conductive part such as the coil terminals 56 and the drive coils 54.

A region of the surrounding wall part 92 interfering with the coil terminals 56 when viewed in the radial direction is cut out and the cut-out region is an opening part 92a through which the coil terminals 56 extended in the radial direction from the stator assembly 40 are passed. The opening part 92a of the surrounding wall part 92 is formed in a height range from a lower end of the surrounding wall part 92 to the vicinity of the cover part 91 (see FIG. 5(b)). An upper hem 92a1 of the opening part 92a is extended in parallel to the cover part 91 at a position offset toward a lower side from the cover part 91. Both sides 92a2 of the opening part 92a in a circumferential direction of the surrounding wall part 92 are extended along the axial line "X" in a straight line shape and the opening part 92a is formed in a substantially rectangular shape when viewed in the radial direction (see FIG. 5(c)).

In the opening part 92a, a protruding part 921 protruding to an outer side in the radial direction is provided on both side parts of the upper hem 92a1. The above-mentioned circuit board 60 is abutted with the protruding parts 921 from an outer side in the radial direction (see FIG. 1), and positioning in the radial direction of the circuit board 60 is performed by the protruding parts 921.

The surrounding wall part 92 of the upper cover member 90 is formed with an engaged part 922 with which an engaging arm 84 of the lower cover member 80 described below is engaged at a position on an opposite side to the opening part 92a interposing the axial line "X". The upper cover member 90 is integrally formed with the connector part 94 and the accommodation part 95 of the connector cover part 93.

As shown in FIG. 3, in the surrounding wall part 92 of the upper cover member 90, the connector cover part 93 covering the opening part 92a is provided on an outer side in the radial direction with respect to the opening part 92a. The connector cover part 93 is extended downward from an outer side in the radial direction of the surrounding wall part 92. The connector cover part 93 is provided with the connector part 94 located on a lower side with respect to the opening part 92a, an accommodation part 95 which accommodates the circuit board 60 connecting connector terminals 61 provided in the connector part 94 with the above-mentioned coil terminals 56, and a cap 96 for closing an opening 930 of the accommodation part 95. In this embodiment, the upper cover member 90 and the connector part 94 (accommodation part 95 and cap 96) are structured of polybutylene terephthalate (PBT), and the upper cover member 90 with which the accommodation part 95 is integrally formed is molded by using a die which is divided into two parts in the upper and lower direction in FIG. 5(a).

As shown in FIG. 4(a), a terminal support part 940 is provided in the connector part 94 at a position on an outer side in the radial direction of the large diameter part 202 and a plurality of the connector terminals 61 is provided in the terminal support part 940 with a space between the connector terminals 61 in the circumferential direction around the axial line "X" (see FIG. 3). Each of the connector terminals 61 is penetrated through the terminal support part 940 in its thickness direction (axial line "X" direction) and, when viewed in the radial direction, the respective connector terminals 61 are located on a lower side with respect to the coil terminals 56 and are provided in a direction substantially perpendicular to the coil terminals 56.

The connector terminals 61 are connected with the corresponding coil terminals 56 respectively through the circuit board 60 and connected parts (soldered parts) of the connector terminals 61 with the circuit board 60 are provided at a position offset by a predetermined height "h" downward in the axial line "X" direction from connected parts (soldered part) of the coil terminals 56 with the circuit board 60. The circuit board 60 connecting the coil terminals 56 with the connector terminals 61 are arranged so that its one end (upper end part 60a) side is extended in a direction along the axial line "X" and the other end (lower end part 60b) side is extended in a direction along an orthogonal direction of the axial line "X" with a curved part 60c as a boundary and thus, the circuit board 60 is curved in a substantially "L"-shape in cross section.

As shown in FIG. 7(b), the terminal support part 940 is provided with a surrounding wall part 941 for surrounding outer peripheries of the connector terminals 61 which are protruded downward from the terminal support part 940. The surrounding wall part 941 is structured of side wall parts 942, which are formed on both sides in a longitudinal direction of the terminal support part 940, an outer wall part 943 which is formed along a side edge on an outer side in the radial direction of the terminal support part 940, and an inner wall part 944 which is formed along a side edge on its inner side in the radial direction.

A radially inner side of the inner wall part 944 (obliquely upper right side in FIG. 7(b)) is cut out while leaving two connecting beams 945 with the terminal support part 940. The cut-out part 944a is provided with a width "L3" larger than a width "L2" of the circuit board 60 and a center in the widthwise direction of the cut-out part 944a is formed with an engaging part 944b for being engaged with an engaging projection (not shown) of an engaging connector. The connecting beams 945 are formed in a substantially rectangular shape in a plan view which is viewed from the axial line "X" side (radially inner side) and are provided along an attaching and detaching direction of an engaging connector to and from the connector part 94. The connecting beams 945 is provided so as to connect the inner wall part 944 with the side edge on the radially inner side of the terminal support part 940 in order to reinforce the inner wall part 944 against a force applied to the engaging part 944b when the engaging connector is to be detached. Therefore, a force applied to the engaging part 944b (inner wall part 944) when an engaging connector is to be detached is transmitted (released) to the terminal support part 940 side and the stress is prevented from being concentrated on the connected part of the inner wall part 944 with the side wall part 942 and the inner wall part 944 is prevented from being broken from the connected part. The connector part 94 in this embodiment is provided with the connecting beams 945 and thus, even when the side wall parts 942 are arranged apart from each other, sufficient strength can be secured. As a result, the width "L3" of the cut-out part 944a (see FIG. 5(b)) can be set larger than the width "L2" of the circuit board 60 (see FIG. 3).

A connected part of the connecting beam 945 with the terminal support part 940 is formed with an inclined face 945a so that a thickness of the connecting beam 945 becomes thinner toward a support face 940b side (upper side in FIG. 4(a)) of the terminal support part 940 for the circuit board 60. Further, a side face exposed to the cut-out part 944a of the terminal support part 940 is formed with an inclined face 940a which is inclined in the similar direction to the inclined face 945a. Therefore, as shown in FIG. 4(a), a space width "W1" between the connecting beam 945 and a reinforcement wall 82 for reinforcing the attaching part 85 described below and a space width "W2" between the terminal support part 940 and the reinforcement wall 82 become wider toward an upper side of the upper cover member 90.

In this embodiment, the outer stator core 59 and the upper cover member 90 are sequentially assembled to the stator assembly 40 (see FIG. 3) in which the circuit board 60 is soldered with the coil terminals 56 and a space "Sa" (see FIG. 4(a)) is secured in the connector cover part 93 on a radially inner side of the terminal support part 940 for avoiding an interference with the coil terminals 56 and the circuit board 60.

In this embodiment, at the time when the upper cover member 90 is assembled, a lower end part 60b of the circuit board 60 is located at a position as shown by the dotted line in FIG. 4(a) and thus, the lower end part 60b side is required to curve to an outer side in the radial direction from this state (see the arrow in FIG. 4(*a*)) and to engage terminal holes 601 provided in the lower end part 60*b* (see FIG. 3) with the connector terminals 61 which are protruded to an upper side from the upper face (support face 940*b*) of the terminal support part 940 and, as a result, the circuit board 60 is supported on the support face 940*b* of the terminal support part 940.

In this case, since the reinforcement wall 82 of the attaching part 85 described below is located on a radially inner side of the terminal support part 940, in a case that a space between the reinforcement wall 82 and the terminal support part 940 is small, when the lower end part 60*b* side of the circuit board 60 is to be curved, the entire circuit board 60 is required to be curved largely and thus a bending radius of the circuit board 60 becomes small. In order to prevent this problem, it is required that a length "L1" in the longitudinal direction of the circuit board 60 (see FIG. 3) is set to be longer so that the length "L1" of the circuit board 60 is provided with an enough margin. In this embodiment, the terminal support part 940 side of the inner wall part 944 is cut out and the radially inner side of the terminal support part 940 is exposed in the cut-out part 944*a* and, in this manner, the space "Sa" on the radially inner side of the terminal support part 940 is widened and, as a result, the space is secured for curving the printed circuit board 60 which is a flexible wiring member. In addition, the connecting beams 945 and the terminal support part 940 are respectively provided with the inclined faces 945*a* and 940*a* to widen the space with respect to the reinforcement wall 82 and the connector terminals 61 are located at close positions to the inclined faces 945*a* and 940*a* in the support face 940*b* of the terminal support part 940.

Therefore, in comparison with a case that the cut-out part 944*a* is not provided, the length "L1" in the longitudinal direction of the circuit board 60 can be shortened and a bending radius of the circuit board 60 can be increased when the circuit board 60 is to be curved. Further, the inclined faces 940*a* and 945*a* are provided and thus the space is enlarged by the inclined faces 940*a* and 945*a*. Therefore, while the inclined faces 940*a* and 945*a* are functioned as a guide when the circuit board 60 is to be curved, a bending radius of the circuit board 60 can be enlarged when the circuit board 60 is to be curved.

Further, since the cut-out part 944*a* is provided in the inner wall part 944, the length "L1" of the circuit board 60 can be shortened. Therefore, in a state that the lower end part 60*b* side of the circuit board 60 is bent at substantially 90 degrees with respect to the upper end part 60*a* side, the curved part 60*c* of the circuit board 60 can be disposed at a position apart from the reinforcement wall 82 made of metal.

When the length "L1" of the circuit board 60 is set to be longer, the curved part 60*c* may be contacted with the reinforcement wall 82 made of metal. The circuit board 60 is provided (printed) with wiring lines which connect the connector terminals 61 with the coil terminals 56 and, when the circuit board 60 and the reinforcement wall 82 are contacted with each other, the circuit board 60 may be damaged by the reinforcement wall 822 due to vibration occurred by driving of the motor "M" and the like and the wiring lines provided in the circuit board 60 are electrically connected with each other through the metal reinforcement wall 82 to occur a short-circuit. As described above, when the inclined faces 940*a* and 945*a* are provided and the length "L1" in the longitudinal direction of the circuit board 60 is shortened, the curved part 60*c* of the circuit board 60 can be disposed at a position apart from the reinforcement wall 82 and thus possibility of occurrence of a short circuit due to contacting of the curved part 60*c* with the reinforcement wall 82 is reduced. In addition, a bending radius of the circuit board 60 can be increased and thus a problem that may be occurred when the bending radius is small, for example, occurrence of a problem that the circuit board 60 and a wiring pattern (copper pattern) provided in the circuit board 60 are broken is preferably prevented.

As shown in FIGS. 5(*a*), 5(*b*) and 5(*c*), the accommodation part 95 of the connector cover part 93 is adjacently provided on an upper side of the connector part 94 and is provided with an upper wall part 951, which is disposed along an upper hem 92*a*1 of the opening part 92*a* of the surrounding wall part 92, and side wall parts 952 which are provided along vertical sides 92*a*2 of the opening part 92*a*. The upper wall part 951 and the side wall parts 952 are protruded to an outer side in the radial direction from an outer peripheral face of the surrounding wall part 92 and, viewed in the radial direction with respect to the axial line "X", they are provided so as to surround the upper side and both right and left sides of the opening part 92*a* provided in the surrounding wall part 92.

The side wall parts 952 is provided over the total length of the vertical sides 92*a*2 of the opening part 92*a* and their upper end parts are connected with both end parts in the longitudinal direction of the upper wall part 951. As shown in FIG. 6(*b*), a lower end part side of the side wall part 952 is protruded in a direction separated from the surrounding wall part 92 toward a lower side and the above-mentioned terminal support part 940 is integrally connected with a lower end of the protruded portion (protruded part 952*c*).

Therefore, the connector part 94 having the terminal support part 940 is held by the side wall parts 952 at a position separated from the outer periphery of the surrounding wall part 92 to an outer side in the radial direction and the protruded parts 952*c* on the lower end side of the side wall parts 952 are functioned as a rib for securing a support strength for the terminal support part 940. In this manner, when an engaging connector is to be pulled out from the connector part 94, a strength against the force acted on the terminal support part 940 is secured. When the portion provided with the terminal support part 940 is viewed in the radial direction with respect to the axial line "X", a peripheral wall (surrounding wall) which surrounds the opening part 92*a* of the surrounding wall part 92 is formed by the terminal support part 940, the upper wall part 951 and the side wall parts 952.

As shown in FIGS. 6(*a*) and 6(*b*), an upper part on the radially inner side of the upper wall part 951 is formed with a concave groove 951*a* between the surrounding wall part 92 and the upper wall part 951. The concave groove 951*a* is formed in an arc shape along an outer periphery of the surrounding wall part 92 when viewed from an upper side. In a circumferential direction around the axial line "X", both end parts 951*a*1 in a longitudinal direction of the concave groove 951*a* are located on a side of the diameter line "1 ml" passing through the axial line "X" with respect to both end parts 951*b* in the longitudinal direction of the upper wall part 951. Therefore, a length in the circumferential direction of the concave groove 951*a* is set to be shorter than a length in the circumferential direction of the upper wall part 951 and thus, both end parts in a widthwise direction of the upper wall part 951 are formed as an engaging part 951*c* for engaging an engaging part 971*b* of the cap 96 described below.

Further, an outer side face of the side wall part 952 in the circumferential direction around the axial line "X" is formed with a step part 954 at a position offset to an inner side from an outer peripheral part 953 of the side wall part 952. An outer peripheral part 953 side of the side wall part 952 with respect to the step part 954 is formed as an inner side fitting wall part 955 to which the fitting wall part 98 of the cap 96 described below is fitted in a spigot joint manner.

In this embodiment, outer side fitting walls 990 of the cap 96 described below are abutted with the step parts 954 in the axial direction of the axial line "X". The step part 954 is provided with a step part 954a, which is extended in an orthogonal direction to the axial line "X" and in parallel to the upper edge part 953a on a lower side to the upper edge part 953a of the outer peripheral part 953, a step part 954b, which is extended in the axial line "X" direction on a surrounding wall part 92 side with respect to an edge part 953b of the outer peripheral part 953 in parallel to the edge part 953b, a step part 954c, which is extended in parallel to an edge part 953c of the outer peripheral part 953 on a lower side with respect to the edge part 953c, and a step part 954d which is extended in a lower direction between the step part 954c and the step part 954b.

The terminal support part 940 connected with the lower ends of the side wall parts 952 is disposed so that its upper face (support face 940b) is set in a direction perpendicular to the axial line "X", and the support face 940b of the terminal support part 940 is located on an upper side, i.e., on the cover part 91 side by a predetermined height "h2" with respect to the upper end 943a of the outer wall part 943 of the connector part 94 (see FIG. 6(b)). A side edge 940c on a radially outer side of the terminal support part 940 is located on an inner side in the radial direction with respect to an outer wall part 943 on the radially outer side of the connector part 94, and the side edge 940c is formed as an abutting face with which an abutting part 974 of the cap 96 is abutted.

FIGS. 8(a), 8(b) and 8(c) are views for explaining the cap 96. The cap 96 is used for closing the opening 930 in the connector cover part 93 and the opening 930 is formed so as to be surrounded by the upper wall part 951, the side wall parts 952 and the terminal support part 940 (see FIG. 6(a)). The cap 96 is provided with a wall part 97 for closing the opening 930 of the connector cover part 93 and both side parts in a widthwise direction of the wall part 97 are formed with the fitting wall parts 98 which are fitted to the side wall parts 952 from an outer side.

As shown in FIG. 4(a), the wall part 97 is provided with an engaging part 971, which is engaged with an upper wall part 951 from an upper side, an inclined part 972 extended obliquely downward from the engaging part 971, and a cover part 973 which is extended downward in a straight line shape from a lower end of the inclined part 972. The engaging part 971 of the wall part 97 is extended in a direction perpendicular to the axial line "X" in a straight line shape and an upper face 971c of the engaging part 971 is located downward with respect to an upper face 91d of the cover part 91 of the upper cover member 90. A tip end of the engaging part 971 is formed with an engaging part 971a which is engaged with the concave groove 951a of the upper wall part 951 over a total length in a widthwise direction of the engaging part 971, and the engaging part 971a is extended downward along the axial line "X" direction.

As shown in FIGS. 8(b) and 8(c), an engaging part 971b which is engaged with the engaging part 951c of the upper wall part 951 is formed on both sides in a longitudinal direction of the engaging part 971a. The cap 96 is provided so that the engaging parts 971b and the engaging part 971a are engaged with the upper wall part 951. Therefore, the cap 96 is prevented from falling off from the connector cover part 93 (falling off in the radial direction) by the engaging parts 971b and the engaging part 971a which are engaged with the upper wall part 951.

A lower end of the cover part 973 is provided with a thin abutting part 974 over a total length in its widthwise direction and, when the cap 96 is assembled to the connector cover part 93, a lower end face 974a of the abutting part 974 is abutted with an upper end 943a of an outer wall part 943 of the connector part 94 in the axial direction of the axial line "X" and its inner side face 974b is abutted with a side edge 940c on the radially outer side of the terminal support part 940 (see FIG. 4(b)).

A fitting wall part 98 is provided on both sides in a widthwise direction of the wall part 97 and is provided in a range from the abutting part 974 to the engaging part 971 along a longitudinal direction of the wall part 97. A tip end side of the fitting wall part 98 is formed in a shape which is matched with a side face shape of the step part 954 provided in an outer periphery of the side wall part 952 in a side view (see FIG. 6(b)). The tip end side of the fitting wall part 98 is provided with an abutting part 981a, which is abutted with the step part 954a in the axial direction of the axial line "X", an abutting part 981b which is abutted with the step part 954b, an abutting part 981c which is abutted with the step part 954c in the axial direction of the axial line "X", and an abutting part 981d which is abutted with the step part 954d.

An inner side face of the fitting wall part 98 is provided with a step part 99 at a position which is offset to an inner side from an outer peripheral part 981 of the fitting wall part 98. The step part 99 is formed in a shape matched with the side face shape of the inner side fitting wall part 955 of the side wall part 952 and an outer peripheral part 981 side of the fitting wall part 98 with respect to the step part 99 is formed as an outer side fitting wall part 990 which is fitted to the inner side fitting wall part 955 of the side wall part 952 in a spigot joint manner.

FIGS. 9(a) through 9(d) are views for explaining a fitting structure of the outer side fitting wall part 990 of the cap 96 of the connector cover part 93 to the inner side fitting wall part 955 of the accommodation part 95. FIG. 9(a) is a perspective view showing the connector cover part 93, FIG. 9(b) is the "C-C" cross-sectional view in FIG. 9(a), FIG. 9(c) is the "B-B" cross-sectional view in FIG. 9(a), and FIG. 9(d) is the "A-A" cross-sectional view in FIG. 9(a). The cross-sectional views in FIGS. 9(b), 9(c) and 9(d) are views showing states which are viewed from the right side in FIG. 9(a) (from the outer side in the radial direction with respect to the axial line "X").

As described above, when the cap 96 is assembled to the accommodation part 95 of the connector cover part 93, the outer side fitting wall part 990 of the cap 96 is fitted to the outer periphery of the inner side fitting wall part 955 of the accommodation part 95 from the outer side. In this case, when water or the like is splashed to the connector cover part 93 from an outer side, there is a possibility that the water or the like enters into the inside through a joining part of the cap 96, which is exposed to the outer periphery of the connector cover part 93, with the accommodation part 95. The valve drive device 1 in accordance with an embodiment of the present invention is a valve drive device for a valve device in which a flow passage for refrigerant in a refrigerator is opened or closed. Therefore, for example, water used in a kitchen, urine excreted from a pet kept in a room, or the like is conceivable as water splashed to the connector cover part 93.

When water is entered through a joining part of the cap 96 exposed to the outer periphery of the connector cover part 93 with the accommodation part 95, as shown in FIGS. 9(*b*) and 9(*d*), in the joining part where the abutting parts 981*a* and 981*c* of the outer side fitting wall part 990 of the fitting wall part 98 are abutted with the step parts 954*a* and 954*c* of the side wall part 952 in the axial direction of the axial line "X", the water may be moved in a direction shown by the arrow in the drawing (direction to an inner side of the connector cover part 93) by a capillary phenomenon or the like. However, the inner side fitting wall part 955 is stood up on the inner side of the joining part and movement of the water in the direction shown by the arrow in the drawing is prevented by the inner side fitting wall part 955. Therefore, the water entered from the joining part of the step parts 954*a* and 954*c* of the side wall part 952 with the abutting parts 981*a* and 981*c* of the outer side fitting wall part 990 does not enter into the inside of the connector cover part 93.

In this embodiment, the step part 954*c* of the side wall part 952 is inclined with respect to the axial line "X" (see FIG. 6(*b*)). Therefore, water entered into the joining part of the step part 954*c* with the abutting part 981*c* of the outer side fitting wall part 990 is moved in a direction shown by the arrow "A1" in FIG. 9(*a*) and is finally discharged from between the cap 96 and the accommodation part 95 to the outer wall part 943 side of the connector part 94. In this case, the support face 940*b* of the terminal support part 940 adjacently disposed to the outer wall part 943 is located on an upper side with respect to the upper end 943*a* of the outer wall part 943 (see FIG. 6(*b*)) and thus the water to be discharged does not contact with the connector terminals 61 supported by the terminal support part 940.

As shown in FIGS. 9(*b*) through 9(*d*), in a portion where the inner side fitting wall part 955 and the outer side fitting wall part 990 are fitted to each other, a capillary force is acted on a gap space "Sx" extended in the upper and lower direction along the joining face of the inner side fitting wall part 955 with the outer side fitting wall part 990. Therefore, when water entered from the joining part of the step parts 954*a*, 954*c* and 954*d* of the inner side fitting wall part 955 with the abutting parts 981*a*, 981*c* and 981*d* of the outer side fitting wall part 990 is reached to the gap space "Sx", the water may be moved within the gap space "Sx" in the drawing to an upper side and reached to a gap space "Sy" where the step part 99 of the outer side fitting wall part 990 faces the edge parts 953*a*, 953*b* and 953*c* of the inner side fitting wall part 955.

In this embodiment, the side face 98*a* on the inner peripheral side of the step part 99 (inner peripheral face of the fitting wall part 98) and the inner peripheral face 955*d* of the inner side fitting wall part 955 are formed to be flush with each other. Therefore, even when water reached to the gap space "Sy" is going to enter into the right side in the drawing (inside of the connector cover part 93), the water is held within the gap space "Sy" by a surface tension and thus entering of the water to the inside of the connector cover part 93 is prevented. On the other hand, when the side face 98*a* and the inner peripheral face 955*d* are not formed to be flush with each other, a difference of the faces causes to form water reservoir at their boundary parts and, after water accumulated in the difference of the faces is grown, the water may be dropped (entered) into the inner side of the connector cover part 93.

Further, as shown in FIG. 9(*c*), gravity is acted on water which is entered into a joining part of the step part 954*b* with the outer side fitting wall part 990 in a portion of the inner side fitting wall part 955 along the step part 954*b* and the entered water may be moved to a lower side in the gravity direction (arrow "A2" direction in the drawing). When the water is moved in the direction shown by the arrow "A2" in the drawing, the moved water is discharged from the joining part where the abutting part 981*d* of the outer side fitting wall part 990 is abutted with the step part 954*d* of the side wall part 952 in the axial direction of the axial line "X" to an outer peripheral face of the side wall part 952 (see the arrow "A3" in FIGS. 9(*a*) and 9(*c*)).

Water (see the arrow "A4" in FIG. 9(*a*)) entered into a gap space between the engaging part 971 of the cap 96 and the surrounding wall part 92 of the upper cover member 90 is discharged to side directions from both end parts 951*a*1 in a longitudinal direction of the concave groove 951*a* through the concave groove 951*a* (see FIG. 6(*a*)) of the upper wall part 951. In this embodiment, both end parts 951*a*1 of the concave groove 951*a* is in communication with the upper edge part 953*a* and thus the water discharged from the concave groove 951*a* is discharged to an outer side through the joining part of the abutting part 981*a* of the outer side fitting wall part 990 with the step part 954*a* of the inner side fitting wall part 955.

In the cap 96, as shown in FIGS. 8(*a*), 8(*b*) and 8(*c*), an outer side face of the abutting part 982 of the fitting wall part 98 with the side face of the engaging part 971 is provided with an engaging part 985 for preventing coming-off of the cap 96. The engaging part 985 is a plate-shaped member which is protruded to a lower side from the abutting part 982 and its center part is formed with an opening part 986 along the longitudinal direction. Both side parts of the opening part 986 is formed with arm parts 985*a* and tip end parts of the arm parts 985*a* are connected with each other through an engaging part 985*b*. When the cap 96 is assembled to the accommodation part 95 of the connector cover part 93, the engaging part 985*b* is engaged with the engaging projection 956 provided in the side wall part 952 (see FIG. 3) and, as a result, the cap 96 is prevented from coming off from the accommodation part 95.

Figure 10:
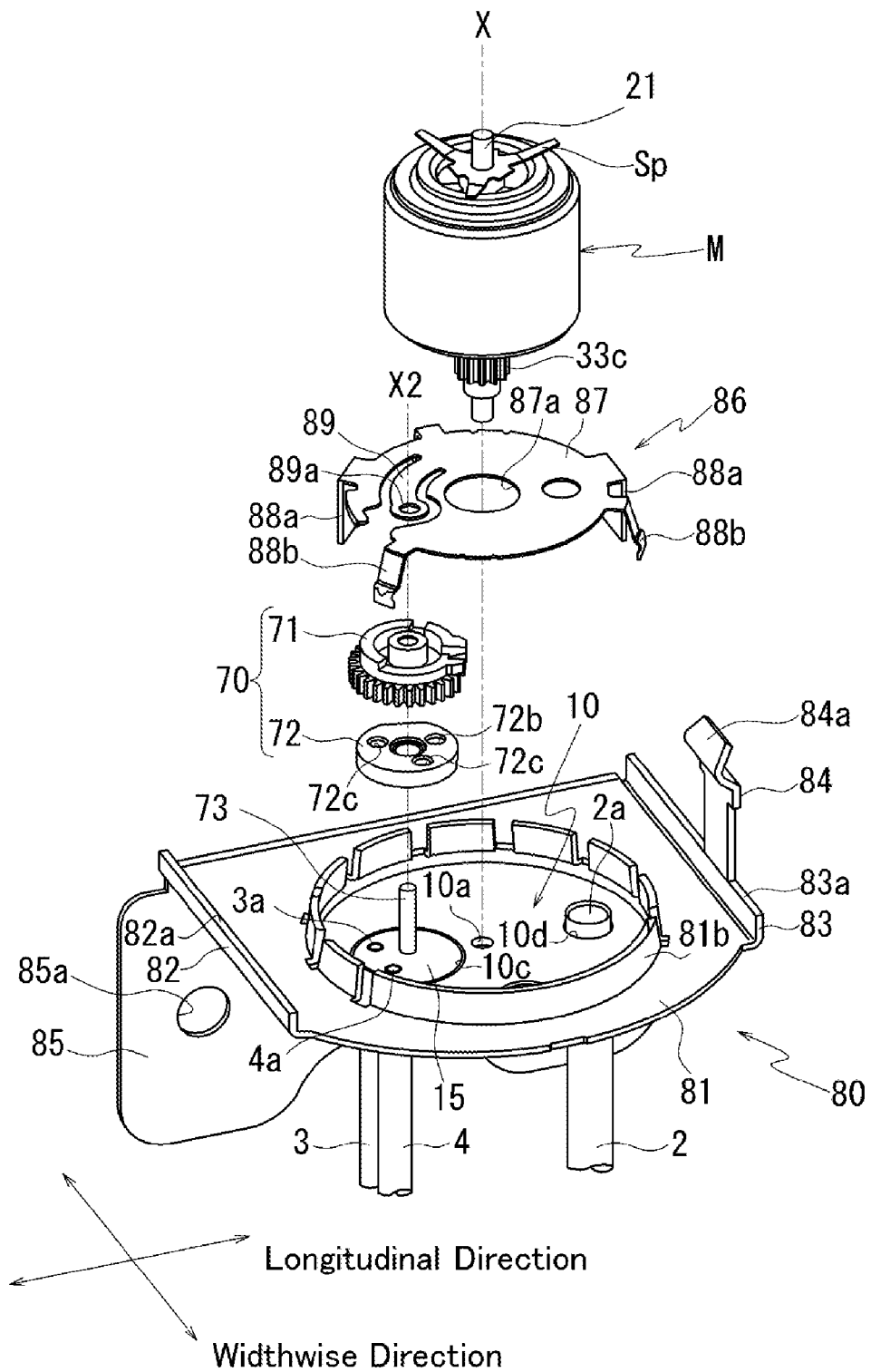
FIG. 10 is an exploded perspective view showing a motor side of a valve drive device.
Figure 11:
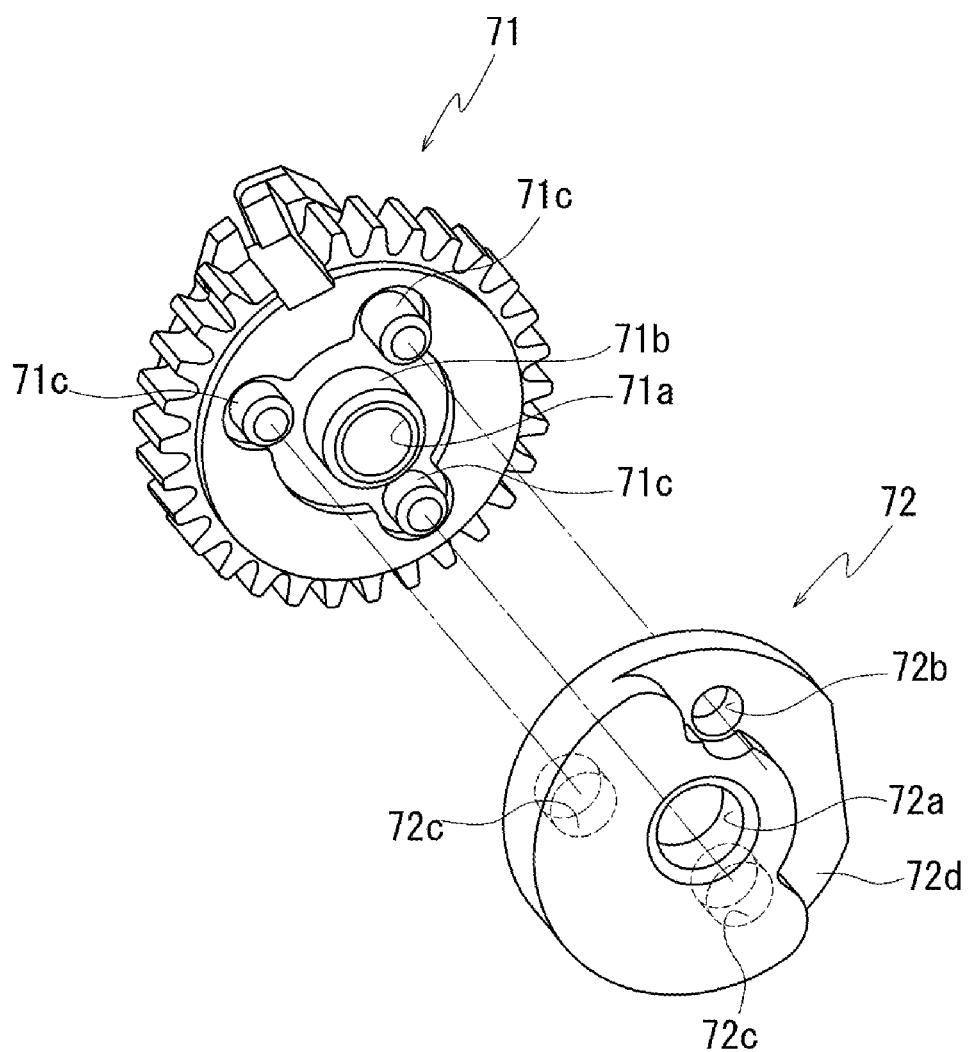
FIG. 11 is an exploded perspective view showing a valve part in a valve drive device.

Next, the valve part 70 which is driven by the motor "M" will be described below. FIG. 10 is an exploded perspective view showing the lower cover member 80, the valve part 70, a table member 86 and a portion of the motor "M" in the valve drive device 1. FIG. 11 is an exploded perspective view showing a gear 71 and a valve body 72 of the valve part 70.

The valve part 70 of the valve drive device 1 is a member which is rotationally driven by the motor "M" around the axial line "X2" (see FIG. 10) and is provided with the gear 71 and the valve body 72. The gear 71 is an external gear meshing with the teeth part 33*c* which is provided on the outer periphery of the transmission shaft 33 of the motor "M". As shown in FIG. 11, a center of the gear 71 is formed with a circular hole part 71*a* and a bottom face of the gear 71 is formed with a center projection 71*b* in a ring shape and a plurality of projections 71*c* (three in this embodiment) disposed around the center projection 71*b*.

The valve body 72 is a member formed in a substantially circular plate shape. A center of the valve body 72 is formed with a circular hole part 72*a* and an upper face of the valve body 72 is formed with a hole part 72*b* and two recessed parts 72*c* which are disposed around the hole part 72*a*. Further, a bottom face of the valve body 72 is formed with a cutout part 72*d*. A portion of the bottom face of the valve body 72 where the cutout part 72*d* is not formed is structured so as to be capable of closing openings 3*a* and 4*a* of the fluid lead-out pipes 3 and 4 (see FIG. 10).

The gear 71 and the valve body 72 are fixed to each other by respectively inserting the center projection 71*b* and three projections 71*c* of the gear 71 into the hole part 72*a*, the hole part 72*b* and two recessed parts 72*c* of the valve body 72. The gear 71 and the valve body 72 are rotatably supported by a shaft member 73 (see FIG. 10) which is passed through the hole part 71*a* and the hole part 72*a*. As shown in FIG. 1, an upper end 73*a* and a lower end 73*b* of the shaft member 73 are respectively held by a support hole 89*a* of the table member 86 and a hole part 15*a* of a connecting member 15 fixed to the bottom plate part 10 in a rotation prevented state.

The connecting member 15 is inserted and fixed to a through hole 10*c* provided in the bottom plate part 10 from a lower side on an opposite side to the motor "M". A center part of the connecting member 15 is formed with a hole part 15*a* for supporting the shaft member 73 so as to open on the fluid chamber "S" side, and an opening 3*a* of the fluid lead-out pipe 3 and an opening 4*a* of the fluid lead-out pipe 4 are located at positions on outer sides in a radial direction with respect to the hole part 15*a* in the connecting member 15 (see FIG. 10). The fluid lead-out pipes 3 and 4 are respectively provided so as to penetrate through the connecting member 15 in the axial line "X" direction and are in communication with the fluid chamber "S" formed on the upper side of the bottom plate part 10.

A through hole 10*d* is provided in the bottom plate part 10 at a position on an opposite side to the through hole 10*c* interposing the center hole part 10*a* and the fluid lead-in pipe 2 is fitted to the through hole 10*d*. In this state, an opening 2*a* of the fluid lead-in pipe 2 is opened to the fluid chamber "S" and the fluid lead-in pipe 2 is in communication with the fluid chamber "S".

As shown in FIG. 10, the table member 86 is placed on an upper face 10*b* (see FIG. 1) of the bottom plate part 10 and the table member 86 is structured of a table part 87 and a plurality of leg parts 88 (88*a* and 88*b*) which are extended downward from a peripheral edge part of the table part 87. A center part of the table part 87 is formed with a hole part 87*a* through which the transmission shaft 33 is passed and an arm part 89 provided with a support hole 89*a* is provided along a circumferential direction around the axial line "X" on an outer side in the radial direction with respect to the hole part 87*a*.

In this embodiment, when the partition 20 is fixed to the bottom plate part 10, the circular plate part 203 of the partition 20 is abutted with the table part 87 to press downward to the bottom plate part 10 side to a position where the leg parts 88*a* are abutted with the bottom plate part 10. In this case, the leg parts 88*b* are protruded to an outer side in the radial direction with respect to the leg part 88*a* and thus, the table member 86 is held within the partition 20 in a state that the leg parts 88*b* are pressed against the inner periphery of the large diameter part 202 of the partition 20.

Further, the arm part 89 supporting the shaft member 73 of the valve part 70 is capable of independently deforming in an axial direction from the table part 87 and, when the table member 86 is pressed downward on the bottom plate part 10 side, the valve body 72 is urged downward on the bottom plate part 10 side. Therefore, the valve body 72 of the valve part 70 is always abutted with the upper face of the bottom plate part 10 by the arm part 89 and positioning of the valve body 72 in the axial direction is performed.

As shown in FIG. 2, the lower cover member 80 is fixed to the large diameter part 202 of the partition 20, which is fixed to the upper face of the bottom plate part 10, from an outer side. The lower cover member 80 is provided with an opening 81*a* into which the large diameter part 202 of the partition 20 is inserted at a center of a plate-shaped base part 81. An inner circumferential edge of the opening 81*a* is provided with a plurality of abutting pieces 81*b* formed so as to be stood up toward upper side in the axial line "X" direction in a circumferential direction around the axial line "X". Each of the abutting pieces 81*b* is protruded in the axial line "X" direction from the opening 81*a* and is capable of elastically deforming to an outer side in the radial direction with respect to the axial line "X". Therefore, when the lower cover member 80 is to be attached to the large diameter part 202 of the partition 20, the large diameter part 202 is inserted into the opening 81*a* of the base part 81 while pushing the abutting pieces 81*b* to an outer side in the radial direction and, as a result, the lower cover member 80 is fixed to the partition 20.

As shown in FIG. 10, an attaching part 85 which is formed so as to be bent toward a lower side in the axial line "X" direction is provided on one side in a widthwise direction of the base part 81. The attaching part 85 is provided for attaching the valve drive device 1 to a refrigerator, which is an external structure, and is provided over a total length in the longitudinal direction of the base part 81. The attaching part 85 is formed with hole parts 85*a* through which a screw or the like is passed. The hole parts 85*a* are located to an outer side with respect to the fluid lead-in pipe 2 and fluid lead-out pipe 3 in the radial direction with respect to the axial line "X" in FIG. 1 where the attaching part 85 is viewed from the front side for preventing interference with the fluid lead-in pipe 2 and the fluid lead-out pipe 3.

As shown in FIG. 10, reinforcing walls 82 and 83 which are formed so as to be bent toward an upper side in the axial line "X" direction are provided on both sides in a longitudinal direction of the base part 81. The reinforcing walls 82 and 83 are respectively formed over a total length in a widthwise direction of the base part 81 and the upper cover member 90 (see FIG. 3) is placed on upper ends 82*a* and 83*a* of the reinforcing walls 82 and 83. In this embodiment, as shown in FIGS. 1 and 3, the coil terminals 56 are located on an upper side of the reinforcing wall 82 and, on the other hand, the reinforcing wall 83 is provided with an engaging arm 84 for holding an engaging state of the lower cover member 80 with the upper cover member 90.

The engaging arm 84 of the reinforcing wall 83 is provided so as to be extended in a direction separated from the base part 81 (upper side) from a substantially center part in its widthwise direction and the engaging part 84*a* is provided on the upper end side of the engaging arm 84 so as to protrude in the axial line "X" direction. The engaging part 84*a* is engaged with an engaged part 922 of the upper cover member 90 when the upper cover member 90 is attached to the outer stator core 59 of the motor "M" from an outer side and, in this manner, falling off of the upper cover member 90 from the lower cover member 80 is prevented.

In the lower cover member 80 in this embodiment, the reinforcing walls 82 and 83 are bent in a direction (upper direction) opposite to a bending direction of the attaching part 85 (lower direction) in the axial direction of the axial line "X" and the base part 81 of the lower cover member 80 is provided with enhanced flexural rigidity. This is because that, when the lower cover member 80 is to be attached (press-fitted) to the large diameter part 202 of the partition 20, the large diameter part 202 is inserted into the opening 81*a* of the base part 81 while outwardly pushing the abutting pieces 81*b* in the radial direction and the lower cover member 80 is fixed to the partition 20 and, however, the base part 81 is prevented from being largely deformed by the stress. In this case, in the lower cover member 80 in this embodiment, the reinforcing walls 82 and 83 on both sides in its longitudinal direction are respectively bent in the same upper direction and thus, working of forming the reinforcing walls 82 and 83 and the attaching part 85 by bending is easily performed in comparison with a case that the reinforcing walls 82 and 83 are bent in different directions (upper and lower directions) in the axial direction of the axial line "X".

Next, an operation example of the valve drive device 1 will be described below with reference to FIGS. 12(*a*) through 12(*d*). FIGS. 12(*a*) through 12(*d*) are views for explaining operation of the valve drive device 1 in which the valve body 72 is viewed from the lower cover member 80 side and the fluid lead-out pipes 3 and 4 are shown by an imaginary line. FIG. 12(*a*) is a view showing a valve closed state in which both of the fluid lead-out pipes 3 and 4 are closed by the valve body 72, FIG. 12(*b*) is a view showing a first valve closed state in which the fluid lead-out pipe 4 is closed by the valve body 72, FIG. 12(*c*) is a view showing a second valve closed state in which both of the fluid lead-out pipes 3 and 4 are opened, and FIG. 12(*d*) is a view showing a third valve closed state in which the fluid lead-out pipe 3 is closed by the valve body 72.

In the valve drive device 1, when an electric current is supplied to the coils 54 through the connector terminals 61 (61*a* through 61*e*), the circuit board 60 and the coil terminals 56, the coils 34 of the stator assemblies 50A and 50B are excited to rotate the rotor 30 by the magnetic force. Rotation of the rotor 30 is transmitted to the valve body 72 through the teeth part 33*c* of the transmission shaft 33 and, as a result, the valve body 72 is driven and turned around the axial line "X2".

<Valve Closed State>

As shown in FIG. 12(*a*), in a state that the cutout part 72*d* is located at a position except the fluid lead-out pipes 3 and 4, the valve body 72 is located in a valve closed state (fully closed) in which the fluid lead-out pipes 3 and 4 are closed and thus leading of fluid from the fluid chamber "S" to the fluid lead-out pipes 3 and 4 is shut off.

<First Valve Open State>

As shown in FIG. 12(*b*), in a state that the gear 71 and the valve body 72 are turned from the valve closed state in a clockwise direction and the cutout part 72*d* is reached to a position of the fluid lead-out pipe 3, the valve body 72 is located in a first valve open state (partly opened) in which the fluid lead-out pipe 3 is opened and the fluid lead-out pipe 4 is closed and thus, leading of the fluid is permitted from the fluid chamber "S" to the fluid lead-out pipe 3 and leading of the fluid to the fluid lead-out pipe 4 is shut off.

<Second Valve Open State>

As shown in FIG. 12(*c*), in a state that the gear 71 and the valve body 2 are further turned from the first valve open state in a clockwise direction and the cutout part 72*d* is reached to the position of the fluid lead-out pipes 3 and 4, the valve body 72 is located in a second valve open state where the fluid lead-out pipes 3 and 4 are opened (fully opened) and leading of fluid from the fluid chamber "S" to the fluid lead-out pipes 3 and 4 is permitted.

<Third Valve Open State>

As shown in FIG. 12(*d*), in a state that the gear 71 and the valve body 72 are further turned from the second valve open state in the clockwise direction and the cutout part 72*d* is passed through the position of the fluid lead-out pipe 3, the valve body 72 is located in a third valve open state (partly opened) where the fluid lead-out pipe 3 is closed and the fluid lead-out pipe 4 is opened and thus, leading of fluid from the fluid chamber "S" to the fluid lead-out pipe 3 is shut off and leading of fluid to the fluid lead-out pipe 4 is permitted.

As described above, in this embodiment, the stator assembly 40 (stator) including the coil 54 (drive coil) is located on an outer side in the radial direction of the rotor 30, the connector part 94 (connector) is provided on an outer side in the radial direction with respect to the rotor 30 so that an engaging connector is assembled in a rotation shaft direction of the rotor (axial line "X" direction), the upper cover member 90 (main body cover) having the surrounding wall part 92 (peripheral wall) which covers an outer periphery of the stator assembly 40 is integrally formed with the connector cover part 93 (connector cover) which covers an outer periphery of the connector part 94 and is extended in the rotation shaft direction from an outer side in the radial direction of the surrounding wall part 92, an opening part 92*a* is provided in the surrounding wall part 92 so that an inner side of the upper cover member 90 is in communication with an inner side of the connector cover part 93 and, in this manner, the motor "M" is structured. In the motor "M", the coil terminals 56, which are connected with end parts of the coils 54 and are extended to an outer side in the radial direction from the stator assembly 40 through the opening part 92*a*, and the connector terminals 61 which are supported by the terminal support part 940 integrally formed with the connector cover part 93 and are extended in the axial line "X" direction at a position offset from the coil terminals 56 in the axial direction of the axial line "X" are connected with each other in the inside of the connector cover part 93. In addition, the inner wall part 944 (wall part) which is extended in the axial line "X" direction along the connector terminals 61 on a radially inner side of the connector terminals 61 is provided in the terminal support part 940, and the inner wall part 944 is located on an outer side in the radial direction with respect to the coil terminals 56 when viewed in the axial line "X" direction and, when the upper cover member 90 and the stator assembly 40 are to be assembled, a space for passing the coil terminals 56 is formed in a radially inner side with respect to the inner wall part 944 on an inner side of the connector cover part 93. The cover structure in a motor in this embodiment is structured as described above.

According to this structure, a space is provided on a radially inner side of the wall part and thus the coil terminals and the wall part are not overlapped with each other when viewed in the axial direction of the stator. Therefore, when the stator is to be assembled to the main body cover, the coil terminals extending to an outer side in the radial direction from the stator do not interfere with the wall part. Accordingly, assembling of the stator to the main body cover can be performed surely.

The cover structure in a motor in this embodiment is structured so that the coil terminals 56 and the connector terminals 61 are connected with each other by curving a flexible circuit board 60 (wiring member) within the connector cover part 93, a space on a radially inner side of the inner wall part 944 is provided so that the circuit board 60 extended in a straight line shape and connected with the coil terminals 56 on its one end side in the longitudinal direction is capable of being curved to an outer side in the radial direction through the space, and the cut-out part 944*a* is provided in the inner wall part 944 and a side edge (taper part 940*a*) on a radially inner side of the terminal support part 940 is exposed in the cut-out part 944*a*.

According to this structure, after the upper cover member 90 and the stator assembly 40 are assembled to each other, the circuit board 60 extended in a straight line shape and connected with the coil terminals 56 is curved to an outer side in the radial direction and the lower end part 60*b* side of the circuit board 60 is connected with the connector terminals 61. In this case, the inner wall part 944 is provided with the cut-out part 944a and a side edge of the terminal support part 940 is exposed to a radially inner side. Therefore, a spatial margin is increased on a radially inner side of the terminal support part 940 on the inner side of the connector cover part 93 and thus, when the circuit board 60 is to be curved, connecting work of the circuit board 60 with the connector terminals 61 is easily performed.

In addition, since a spatial margin on an inner side of the connector cover part 93 is increased, a length "L1" in a longitudinal direction of the circuit board 60 which is required to be curved can be shortened in comparison with a case that the taper parts 940a and 945a are not provided. Therefore, slacking of the circuit board 60 connected with the coil terminals 65 and the connector terminals 61 in a curved state can be suppressed and thus interference of the circuit board 60 with other components located within the connector cover part 93 and within the upper cover member 90 can be prevented.

In a case of a motor having a conventional structure in which insulative potting material is filled from an opening of a lower part of the upper cover member 90 to seal components and the like disposed in the upper cover member 90 and the connector cover part 93 within the potting material for preventing interference of the components with other components, slacking of the circuit board 60 does not become a problem because the circuit board 60 is held within the potting material. In recent years, various motors without using potting material have been proposed for reducing a manufacturing cost but, in these motors, when slacking of the circuit board 60 becomes large, interference of the circuit board 60 with other components becomes a problem. However, according to the above-mentioned structure, the length "L1" in the longitudinal direction of the circuit board 60 is restrained and slacking of the curved part 60c after being assembled can be suppressed and thus, at least an embodiment of the present invention can be applied to a motor without a problem in which potting material is not used. Especially, in a case that the reinforcing wall 82 of the metal attaching part 85 for attaching the motor to an attached member of a main apparatus is located on the lower part side within the upper cover member 90, when the reinforcing wall 82 of the attaching part 85 is contacted with the circuit board 60, the circuit board 60 may be damaged by the metal member due to vibration or the like occurred by driving of the motor and thus, wiring lines provided in the circuit board 60 may be electrically connected with each other through the metal member to occur a short circuit. However, according to this embodiment, occurrence of the short circuit can be appropriately prevented.

In addition, when a spatial margin on the inner side of the connector cover part 93 is increased, a bending radius of the circuit board 60 when the circuit board 60 is curved can be set larger. Therefore, a problem which may be occurred when the bending radius is small, for example, occurrence of a problem in which the circuit board 60 or a wiring pattern (copper pattern) provided in the circuit board 60 may be damaged can be appropriately prevented.

The cover structure in a motor in this embodiment is structured so that the inner wall part 944 is provided with an engaging part 944b for engaging an engaging projection of an engaging connector by cutting out a part of the inner wall part 944. Further, the connecting beam 945 connecting the inner wall part 944 with a side edge on a radially inner side of the terminal support part 940 is provided in the cut-out part 944a provided in the inner wall part 944 and is formed thinner than the inner wall part 944, and a connected part of the connecting beam 945 with the terminal support part 940 is provided with the inclined face 945a by which a thickness of the connecting beam 945 becomes thinner toward the support face 940b side (upper side in FIG. 4(*a*)) of the terminal support part 940 for the circuit board 60 so that the space "Sa" on the radially inner side of the terminal support part 940 is increased.

When a part of the inner wall part 944 is cut out to provide the engaging part 944b, the strength of the inner wall part 944 is decreased. In order to prevent this problem, the connecting beam 945 connecting the inner wall part 944 with a side edge on the radially inner side of the terminal support part 940 is provided to reinforce the strength of the inner wall part 944. In this case, since the connecting beam 945 is formed to be thinner than the inner wall part 944, the space "Sa" which is secured on the radially inner side of the inner wall part 944 by providing the cut-out part 944a is prevented from being largely narrowed by the connecting beam 945. In addition, the inclined face 945a is provided in the connecting beam 945 and the inclined face 945a functions as a guide for curving the circuit board 60 and thus, a curving operation for connecting with the connector terminals 61 of the other end side of the circuit board 60 whose one end side in the longitudinal direction is connected with the coil terminals 56 can be performed smoothly.

The rotor 30 is rotatably provided in an inside of the small diameter part 201 of the partition 20 formed in a bottomed cylindrical shape and the large diameter part 202 of the partition 20 which is located on a lower side of the small diameter part 201 is fixed with the metal attaching part 85 for attaching the valve drive device 1 to an attached member of a refrigerator or the like in an outwardly inserted state, and the reinforcing wall 82 of the attaching part 85 is located on a lower side with respect to the circuit board 60 which is disposed so as to be curved within the connector cover part 93.

According to this structure, slacking of the curved circuit board 60 can be restrained while shortening the length "L1" of the circuit board 60 and thus, even when the metal reinforcing wall 82 is located on a lower side of the circuit board 60, the circuit board 60 and the reinforcing wall 82 can be appropriately prevented from being interfered with each other. If the circuit board 60 and the reinforcing wall 82 are interfered with each other, the circuit board 60 may be damaged by the reinforcing wall 822 due to vibration occurred by driving of the motor "M" and the like and the wiring lines provided in the circuit board 60 are electrically connected with each other through the metal reinforcing wall 82 to occur a short circuit or an electric leakage. However, according to the above-mentioned structure, occurrence of the problem is prevented appropriately.

The connector cover part 93 is provided with the opening 930 through which the connected parts of the circuit board 60 disposed in a curved state with the coil terminals 56 and the connector terminals 61 in the inside of the connector cover part 93 can be visually observed and the cap 96 which closes the opening 930.

According to this structure, the connected parts of the circuit board 60 with the connector terminals 61 can be visually observed through the opening 930 and thus connecting work (soldering work) of the circuit board 60 with the connector terminals 61 can be performed through the opening 930. Therefore, even when a lower end part 60b side of the circuit board 60 is curved and connected with the connector terminals 61 in the inside of the connector cover part 93 after the circuit board 60 is firstly connected with the coil terminals 56, a connected part where the connector terminals 61 and the circuit board 60 to be connected with each other is not hidden by the cover and thus connecting work (soldering work) of the circuit board 60 with the connector terminals 61 can be performed easily.

The opening 930 in the connector cover part 93 is opened on an outer side in the radial direction of the opening part 92a provided in the surrounding wall part 92, and the outer sides in the radial direction of the coils 54, the coil terminals 56, the connector terminals 61 and the circuit board 60 are covered by the surrounding wall part 92, the connector cover part 93 and the cap 96.

According to this structure, the outer sides in the radial direction of the conductive part (coil 54, coil terminals 56, connector terminals 61 and circuit board 60) are covered by the surrounding wall part 92, the connector cover part 93 and the cap 96 and thus water splashed from an outer side in the radial direction can be appropriately prevented from affecting the conductive part.

In addition, since the attaching part 85 is structured of a metal plate member, even when a press-fitting margin in the axial line "X" direction of the attaching part 85 to the large diameter part 202 is short, the attaching part 85 can be strongly fixed to the large diameter part 202.

The connected part of the circuit board 60 with the connector terminals 61 and the connected part of the circuit board 60 with the coil terminals 56 are provided at positions offset in the rotation shaft direction (axial direction of the axial line "X") of the rotor 30.

According to this structure, space for passing the circuit board 60 can be secured broadly, connection of the circuit board 60 with the coil terminals 56 and the connector terminals 61 are easily performed.

Although the present invention has been shown and described with reference to a specific embodiment, various changes and modifications will be apparent to those skilled in the art from the teachings herein. For example, the valve drive device in accordance with the present invention may be applied to a flow passage for fluid other than refrigerant in a refrigerator and the structure for opening and closing a flow passage by the valve body 72 may be modified appropriately.

In the embodiment described above, as an example, a flexible circuit board (printed circuit board) in which wiring lines are buried is used as a wiring member. However, two rigid circuit boards which are structured to be bendable by connecting through lead wires or the like, lead wires, a metal body having rigidity may be used as the wiring member.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A cover structure in a motor comprising:
   a rotor;
   a stator having a drive coil which is located on an outer side in a radial direction of the rotor;
   a connector which is provided on an outer side in the radial direction with respect to the rotor so that an engaging connector is engaged in a rotation shaft direction of the rotor;
   a main body cover having a peripheral wall which covers an outer periphery of the stator, the main body cover covering an outer periphery of the connector and being integrally formed with a connector cover extending in the rotation shaft direction from an outer side in the radial direction of the peripheral wall;
   an opening part which is provided in the peripheral wall so that an inner side of the main body cover is in communication with an inner side of the connector cover;
   coil terminals which are connected with an end part of the drive coil and are extended from the stator to an outer side in the radial direction through the opening part;
   connector terminals which are supported by a terminal support part integrally formed with the connector cover and are extended in the rotation shaft direction at a position offset from the coil terminals in the rotation shaft direction, the connector terminals and the coil terminals being connected with each other in an inside of the connector cover; and
   a wall part which is provided on a radially inner side of the terminal support part so as to extend in the rotation shaft direction along the connector terminals;
   wherein the wall part is located on an outer side in the radial direction with respect to the coil terminals when viewed in the rotation shaft direction; and
   wherein a space is formed on a radially inner side of the wall part on an inner side of the connector cover.

2. The cover structure in a motor according to claim 1, wherein
   the coil terminals and the connector terminals are connected with each other through a flexible wiring member which is curved in the inside of the connector cover,
   the space is formed so that the flexible wiring member whose one end side in a longitudinal direction is connected with the coil terminals and which is extended in a straight line shape curved to an outer side in the radial direction, and
   the wall part is provided with a cut-out part so as to expose a side edge on a radially inner side of the terminal support part in the cut-out part.

3. The cover structure in a motor according to claim 2, wherein
   the wall part is provided with an engaging part with which the engaging connector is engaged,
   a connecting beam which connects the wall part with the side edge on the radially inner side of the terminal support part is provided to be thinner than the wall part in the cut-out part, and
   a connected part of the connecting beam with the terminal support part is provided with a taper part so that the space is enlarged toward the inside of the connector cover.

4. The cover structure in a motor according to claim 2, wherein
   the rotor is rotatably provided in an inside of a cylindrical shaped case,
   a metal attaching part for attaching the motor to a corresponding attached member is inserted and fixed to an outer periphery of the cylindrical shaped case from an outer side on a lower side with respect to the rotor in the rotation shaft direction, and the metal attaching part is located on a lower side with respect to the wiring member which is disposed in a curved state in the inside of the connector cover.

5. The cover structure in a motor according to claim 4, wherein
the cylindrical shaped case is a partition having a bottomed cylindrical shape which is provided with an outward form enlarged in two steps in a direction separated from a bottom part of the partition,
the partition is structured of a small diameter part on a bottom part side, a large diameter part having a larger diameter than the small diameter part, and a circular plate part connecting the small diameter part with the large diameter part,
the rotor is provided on an inner side of the small diameter part,
a stator assembly structuring the stator is attached to an outer periphery of the small diameter part so as to be positioned in the rotation shaft direction by the circular plate part,
the metal attaching part is provided with an opening into which the large diameter part of the partition is inserted, and
an inner circumferential edge of the opening is formed with an abutting piece which is abutted with the large diameter part.

6. The cover structure in a motor according to claim 5, wherein
the opening part is formed to be opened to an outer side in the radial direction of the stator by being surrounded by an upper wall part provided along an upper hem of the opening part, side wall parts provided along vertical sides of the opening part, and the terminal support part provided with the connector terminals,
a lower end part side of the side wall part is formed with a protruded part which is protruded in a direction separated from the surrounding wall part toward a lower side,
the terminal support part is integrally connected with a lower end of the protruded part,
the terminal support part is provided with a surrounding wall part which surrounds outer periphery of the connector terminals protruded downward from the terminal support part,
the surrounding wall part is structured of side wall parts provided on both sides of the terminal support part, an outer wall part provided along a side edge on an outer side in the radial direction of the terminal support part, and an inner wall part as the wall part which is provided along a side edge on an inner side in the radial direction, and
a terminal support part side of the inner wall part in the surrounding wall part protruded downward from the terminal support part is cut out and thereby a space is secured for curving the flexible wiring member extended in a straight line shape on a radially inner side of the terminal support part.

7. The cover structure in a motor according to claim 6, wherein a reinforcing part for reinforcing the metal attaching part is provided between the abutting piece provided in the inner circumferential edge of the opening of the metal attaching part and the inner wall part of the surrounding wall part protruded downward from the terminal support part.

8. The cover structure in a motor according to claim 2, wherein the connector cover includes an opening, through which the flexible wiring member disposed in a curved state in the inside of the connector cover is visually observed, and a cap for closing the opening.

9. The cover structure in a motor according to claim 8, wherein
the opening of the connector cover is opened to an outer side in the radial direction with respect to the opening part, and
outer sides in the radial direction of the drive coil, the coil terminals, the connector terminals and the flexible wiring member are covered by the peripheral wall, the connector cover and the cap.

10. The cover structure in a motor according to claim 9, wherein
the opening is formed to be opened to an outer side in the radial direction of the stator by being surrounded by an upper wall part provided along an upper hem of the opening, side wall parts provided along vertical sides of the opening, and the terminal support part provided with the connector terminals, and
each of a connected part of the coil terminals with the flexible wiring member and a connected part of the connector terminals with the flexible wiring member is visually observable from an outer side in the radial direction through the opening.

11. The cover structure in a motor according to claim 1, wherein
the coil terminals and the connector terminals are connected with each other through a flexible wiring member which is curved in an inside of the connector cover,
the flexible wiring member is a flexible printed circuit board which is disposed so that its upper end part side extended in a straight line shape is disposed along the rotation shaft direction and is connected with the coil terminals and that its lower end part side is directed to an outer side in the radial direction and is connected with the connector terminals and thus the flexible printed circuit board is curved in a substantially "L" shape with a curved part of the flexible printed circuit board as a boundary, and
the lower end part side of the flexible printed circuit board extended in a straight line shape is curved to an outer side in the radial direction through the space formed on the radially inner side of the wall part and thereby the flexible printed circuit board is connected with the connector terminals.

12. The cover structure in a motor according to claim 11, wherein
the opening part is formed to be opened to an outer side in the radial direction of the stator by being surrounded by an upper wall part provided along an upper hem of the opening part, side wall parts provided along vertical sides of the opening part, and the terminal support part provided with the connector terminals,
a lower end part side of the side wall part is formed with a protruded part which is protruded in a direction separated from the surrounding wall part toward a lower side, and
the terminal support part is integrally connected with a lower end of the protruded part.

13. The cover structure in a motor according to claim 11, wherein
the rotor is rotatably provided in an inside of a cylindrical shaped case,
a metal attaching part for attaching the motor to a corresponding attached member is inserted and fixed to an outer periphery of the cylindrical shaped case from an outer side on a lower side with respect to the rotor in the rotation shaft direction, and the metal attaching part is located on a lower side with respect to the wiring member which is disposed in a curved state in the inside of the connector cover.

14. The cover structure in a motor according to claim 13, wherein the cylindrical shaped case is a partition having a bottomed cylindrical shape which is provided with an outward form enlarged in two steps in a direction separated from a bottom part of the partition, the partition is structured of a small diameter part on a bottom part side, a large diameter part having a larger diameter than the small diameter part, and a circular plate part connecting the small diameter part with the large diameter part, the rotor is provided on an inner side of the small diameter part, a stator assembly structuring the stator is attached to an outer periphery of the small diameter part so as to be positioned in the rotation shaft direction by the circular plate part, the metal attaching part is provided with an opening into which the large diameter part of the partition is inserted, and an inner circumferential edge of the opening is formed with an abutting piece which is abutted with the large diameter part.

15. The cover structure in a motor according to claim 1, wherein a connected part of the coil terminals with a wiring member and a connected part of the connector terminals with the wiring member are provided at positions offset in the rotation shaft direction of the rotor.

* * * * *